(12) United States Patent
Tajima et al.

(10) Patent No.: US 9,049,380 B2
(45) Date of Patent: Jun. 2, 2015

(54) IMAGE PROCESSING APPARATUS FOR GENERATING AN IMAGE HAVING AN EXPANDED DYNAMIC RANGE AND METHOD THEREOF, AND IMAGE CAPTURE APPARATUS

(75) Inventors: Kaori Tajima, Tokyo (JP); Yu Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/617,772

(22) Filed: Sep. 14, 2012

(65) Prior Publication Data

US 2013/0076937 A1    Mar. 28, 2013

(30) Foreign Application Priority Data

Sep. 26, 2011  (JP) ................................. 2011-209784
Sep. 26, 2011  (JP) ................................. 2011-209785

(51) Int. Cl.
    *H04N 5/228*     (2006.01)
    *H04N 5/235*     (2006.01)
    *H04N 5/355*     (2011.01)
    *G06K 9/40*      (2006.01)

(52) U.S. Cl.
    CPC ............ *H04N 5/2355* (2013.01); *H04N 5/2356* (2013.01); *H04N 5/355* (2013.01)

(58) Field of Classification Search
    CPC .............. H04N 5/2355; H04N 5/2356; H04N 5/23232; G06T 5/50
    USPC ........ 348/218.1, 222.1, 229.1, 234, 239, 362; 382/232, 274
    See application file for complete search history.

(56) References Cited

U.S. PATENT DOCUMENTS

| 2009/0073292 A1* | 3/2009 | Castorina et al. ............. 348/294 |
| 2010/0157078 A1* | 6/2010 | Atanassov et al. ......... 348/222.1 |
| 2010/0177203 A1* | 7/2010 | Lin ............................ 348/222.1 |
| 2010/0328490 A1* | 12/2010 | Kurane et al. .............. 348/229.1 |
| 2011/0157419 A1* | 6/2011 | Nayar et al. ............... 348/229.1 |
| 2011/0254976 A1* | 10/2011 | Garten ....................... 348/229.1 |

FOREIGN PATENT DOCUMENTS

| JP | 07-131704 | 5/1995 |
| JP | 3731577 | 1/2006 |

\* cited by examiner

*Primary Examiner* — Kelly L Jerabek
(74) *Attorney, Agent, or Firm* — Cowan, Liebowitz & Latman, P.C.

(57) ABSTRACT

An image capture apparatus generating an image, a dynamic range of which is expanded by composing two images having different exposure amounts, includes an imaging unit which continuously outputs images captured to have two different exposure amounts. A system control unit of the image capture apparatus stores in a memory an image of the first frame of two frames to be composed, which are continuously output from the imaging unit, and composes an image of the second frame output from the imaging unit and the image held in the memory so as to expand a dynamic range. The system control unit generates tone compression characteristics based on the image held in the memory and an image obtained by reducing a resolution of the held image, and compresses tones of the composed image using the generated tone compression characteristics.

22 Claims, 15 Drawing Sheets

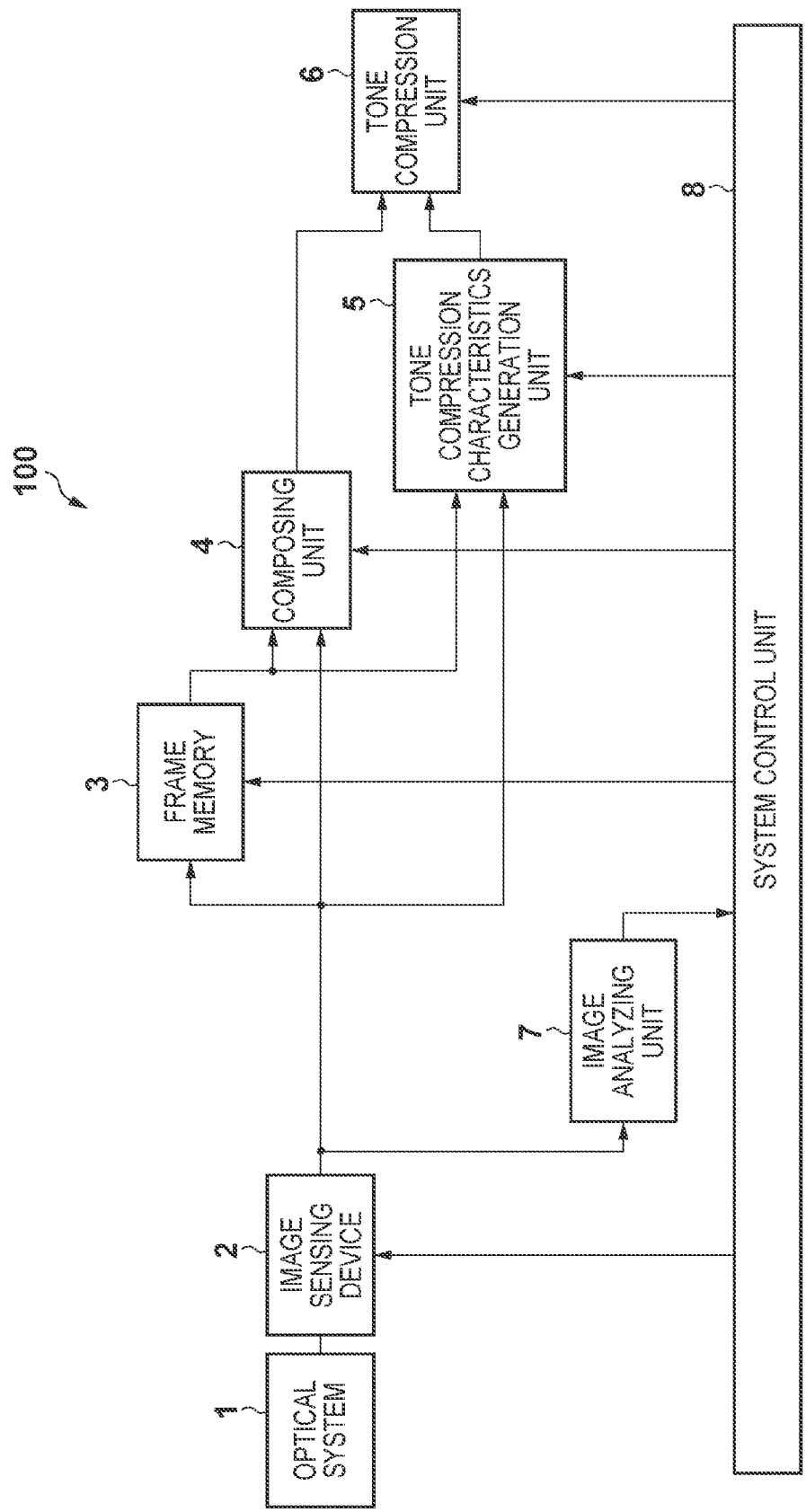

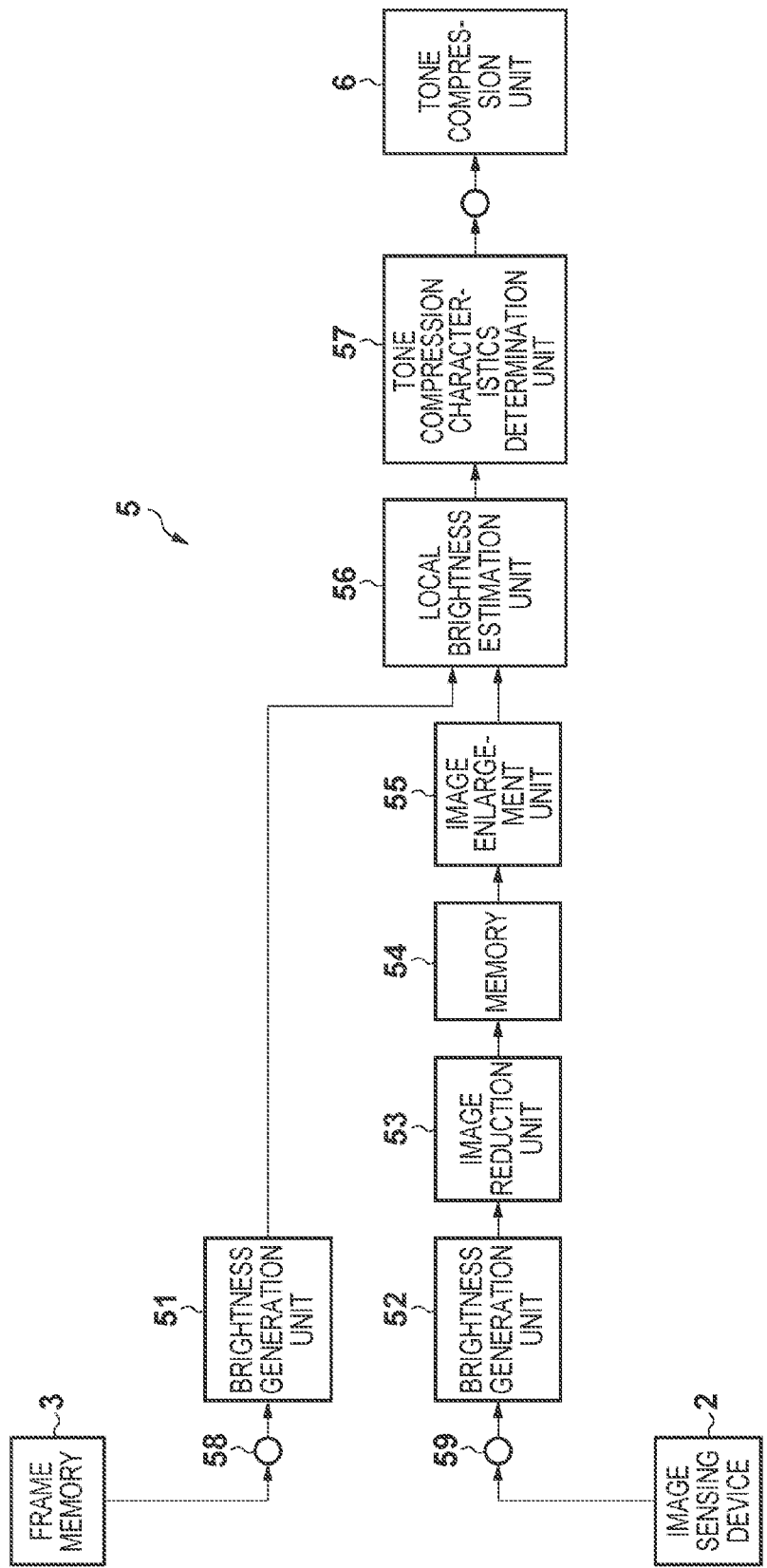

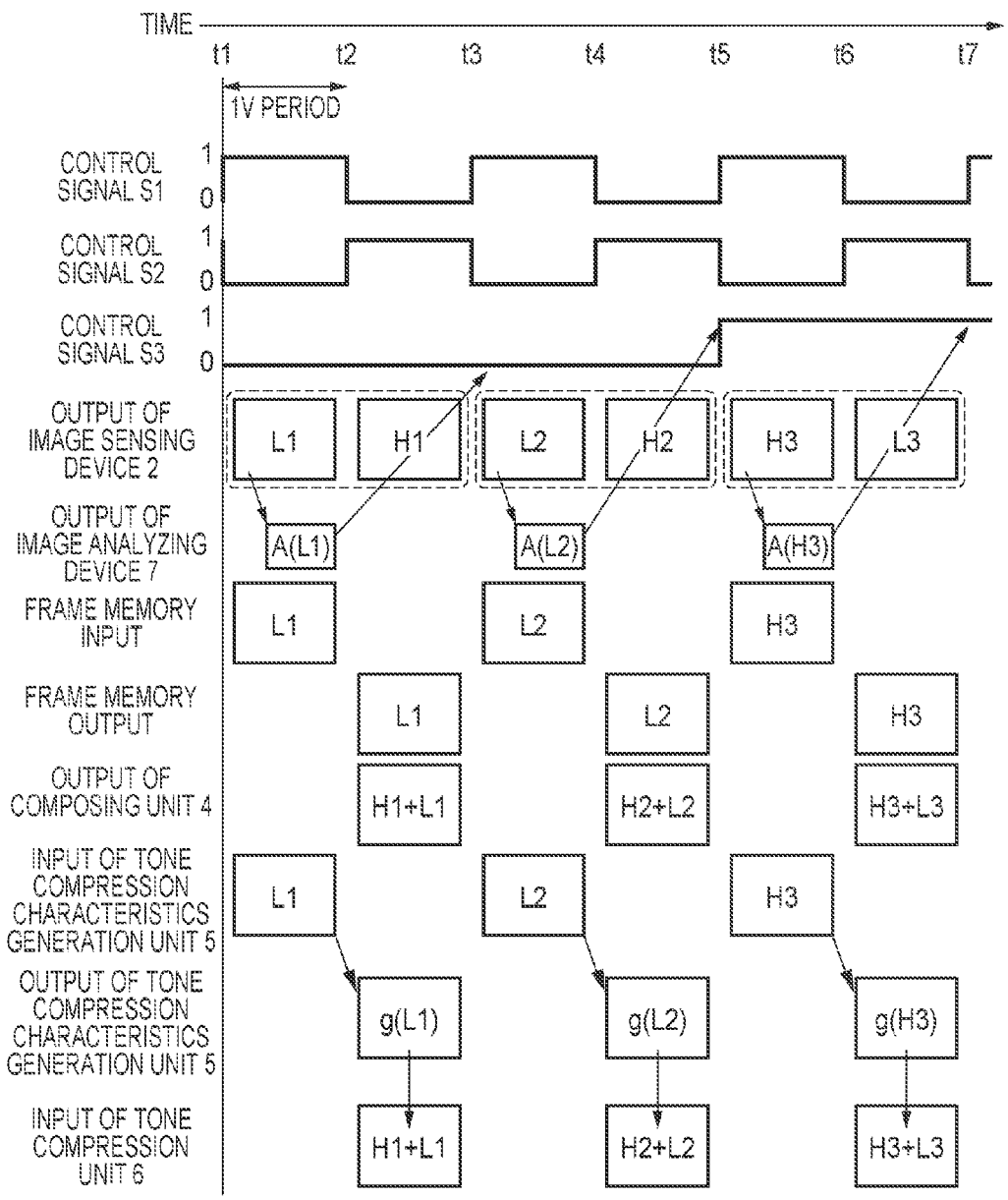

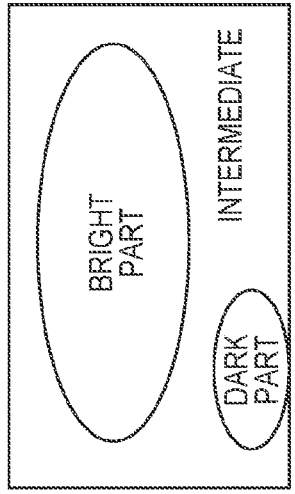
FIG. 4A
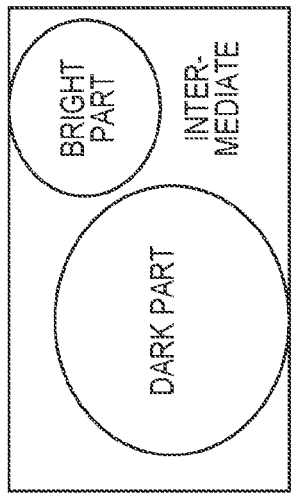
FIG. 4B
| INPUT IMAGE OF TONE COMPRESSION CHARACTERISTICS GENERATION UNIT 5 | MERIT | DEMERIT | BRIGHTNESS REGION WITH HIGH DEGREE OF FREEDOM IN ADJUSTMENT OF TONE COMPRESSION CHARACTERISTICS |
|---|---|---|---|
| LOW-EXPOSURE IMAGE | CORRECTABLE ON ALL BRIGHTNESS REGIONS | LOW S/N | BRIGHT PART |
| HIGH-EXPOSURE IMAGE | HIGH S/N | UNCORRECTABLE REGION IN BRIGHT PART | DARK PART |
FIG. 5

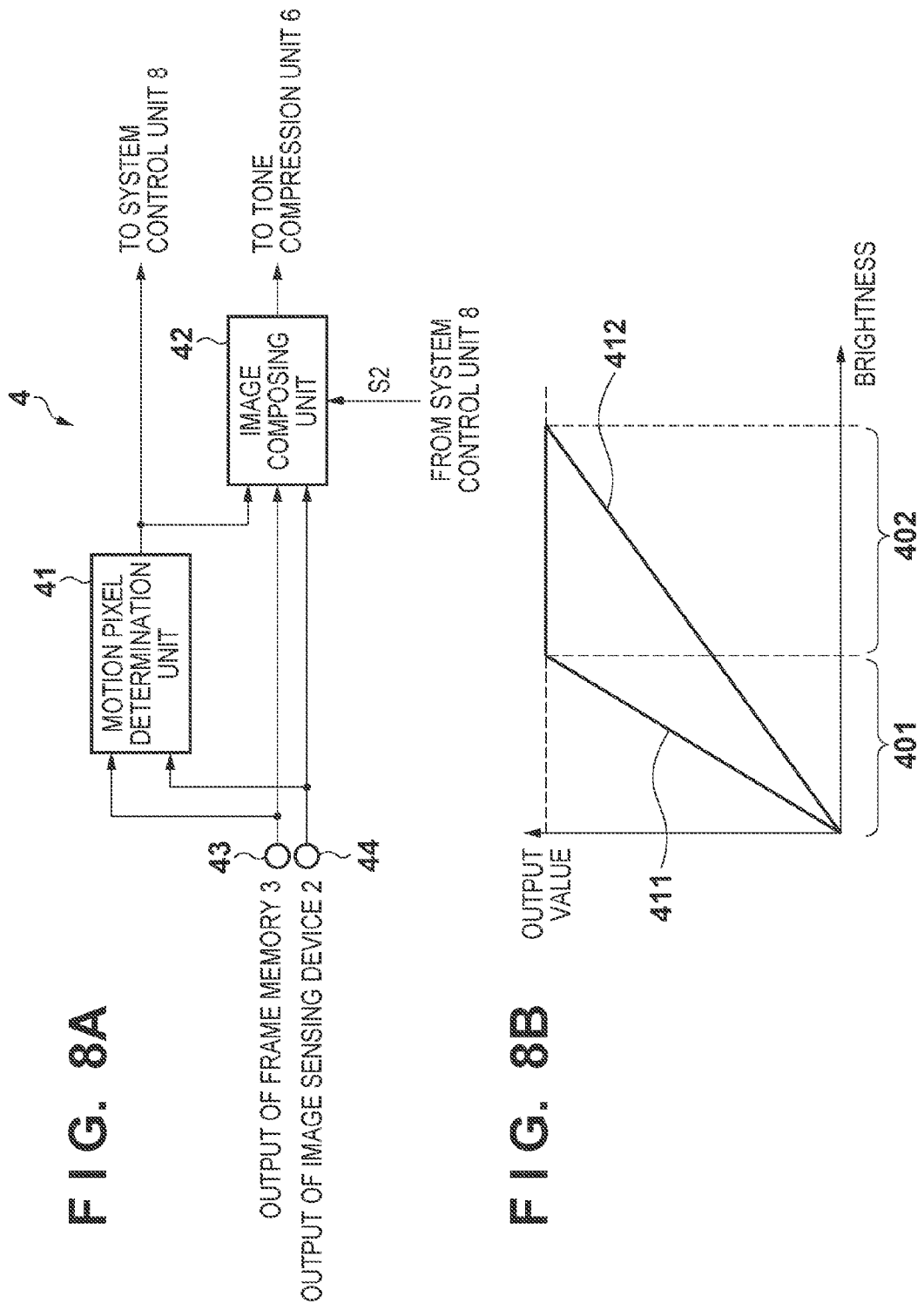

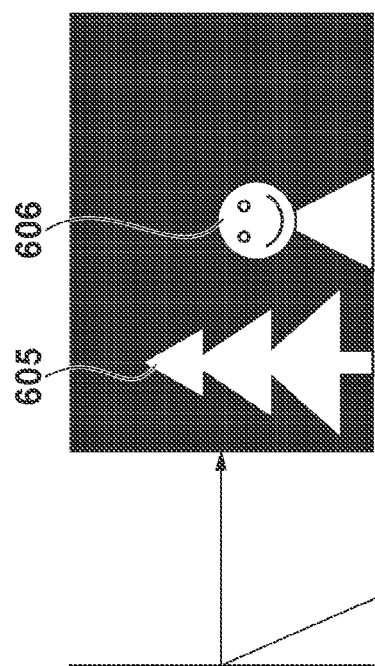
FIG. 10A HIGH-EXPOSURE IMAGE
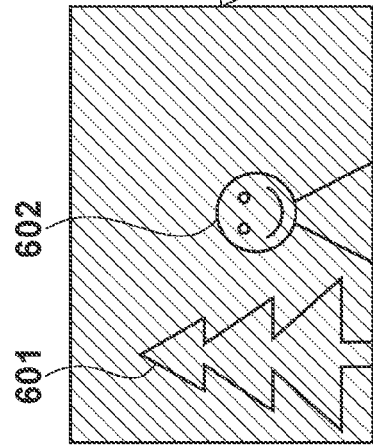
FIG. 10B LOW-EXPOSURE IMAGE
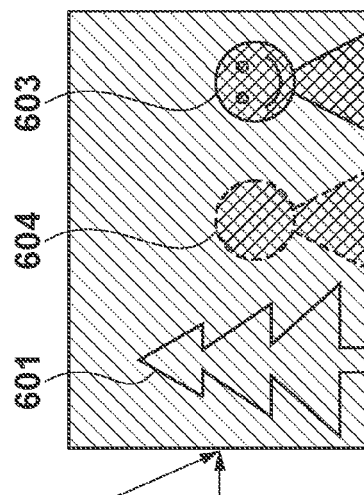
FIG. 10C TONE COMPRESSION CHARACTERISTICS GENERATED FROM HIGH-EXPOSURE IMAGE
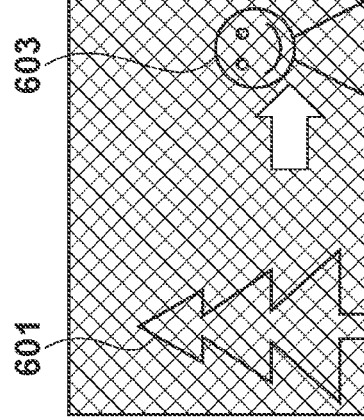
FIG. 10D COMPOSED IMAGE

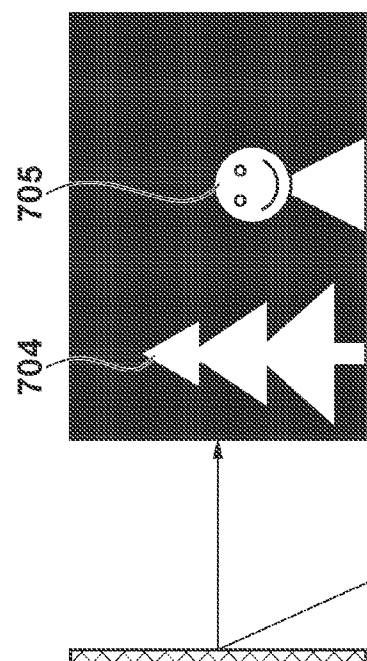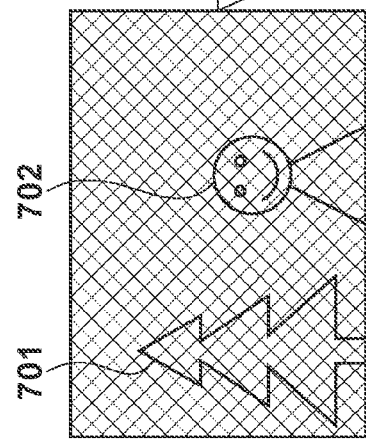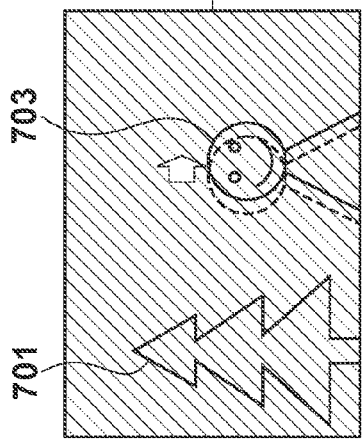

F I G. 12

| ΔLH | MOTION DETERMINATION | COMPOSING | TONE COMPRESSION CHARACTERISTICS | |
|---|---|---|---|---|
| | | | L | H |
| LARGE | MOTION | L | ○ | ✕ (FIG. 10A~10D) |
| SMALL | STILL | H | △ (FIG. 11A~11D) | ○ |
| NEARLY 0 | STILL | H | ○ | ○ |

F I G. 16 *(PRIOR ART)*
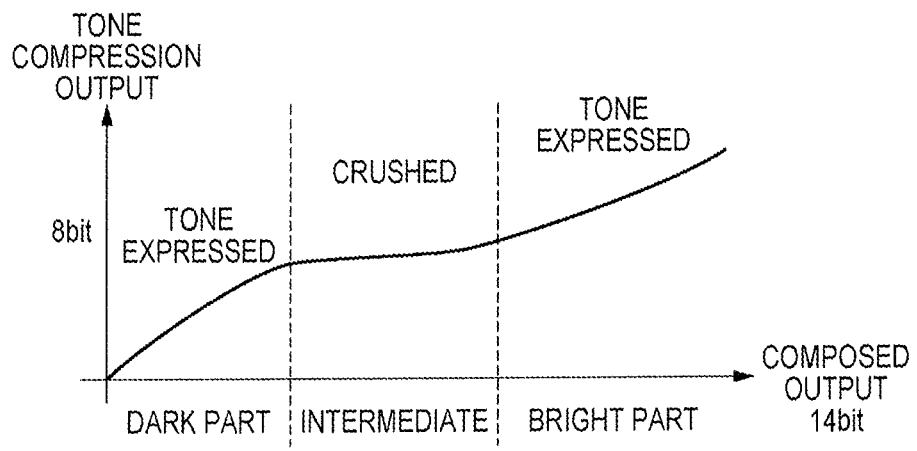
F I G. 17
| | | | | |
|---|---|---|---|---|
| L0 | R | G | R | G |
| L1 | G | B | G | B |
| L2 | R | G | R | G |
| L3 | G | B | G | B |
| L4 | R | G | R | G |
| L5 | G | B | G | B |
| L6 | R | G | R | G |
| L7 | G | B | G | B |

IMAGE PROCESSING APPARATUS FOR GENERATING AN IMAGE HAVING AN EXPANDED DYNAMIC RANGE AND METHOD THEREOF, AND IMAGE CAPTURE APPARATUS

BACKGROUND OF THE INVENTION

1. Field of the Invention

The present invention relates to an image processing apparatus and method thereof, and an image capture apparatus, which generate an image having a broad dynamic range by composing a plurality of captured images having different exposure amounts.

2. Description of the Related Art

In general, an image processing apparatus which composes a plurality of captured images having different exposure amounts to broaden a dynamic range, and executes tone compression to fit the dynamic range of an output apparatus has been proposed (Japanese Patent Laid-Open No. 07-131704 (to be referred to as literature 1 hereinafter)). Also, image processing which converts an input image into images of a plurality of resolutions, and optimizes tone compression characteristics for each small region around a pixel of interest of the input image using these images so as to compress the dynamic range of the input image has been proposed (Japanese Patent No. 03731577 (to be referred to as literature 2 hereinafter)).

However, with the technique described in literature 1, an image of a broad dynamic range, which is generated by composing a plurality of images having different exposure amounts, undergoes tone compression to fall within the dynamic range of an output apparatus to have uniform characteristics according to a brightness in a frame as shown in FIG. 16. For this reason, a brightness region where tone reproducibility is lost is generated.

On the other hand, with the technique described in literature 2, in order to generate tone compression characteristics, multi-resolution processing is required. That is, images of a plurality of types of resolutions, which are generated from an input image, have to be referred to at the same timing. For this purpose, a timing has to be adjusted by buffering a high-resolution image in a frame memory while generating a low-resolution image. Buffering of an image using the frame memory imposes a heavy load on an image capture system especially when a moving image is to be captured and when an image size and bit width are large.

SUMMARY OF THE INVENTION

The present invention has been made in consideration of the above problems, and one embodiment of the present invention provides an image processing apparatus and method thereof, and an image capture apparatus, which suppress an increase in system load when an image of a broad dynamic range is generated by composing a plurality of captured images having different exposure amounts.

According to one aspect of the present invention, there is provided an image capture apparatus, which generates an image, a dynamic range of which is expanded, by composing two images having different exposure amounts, comprising: an imaging unit configured to output a first image and a second image which follows the first image by imaging operations that sequentially apply two different exposure amounts; a composing unit configured to generate a composed image, a dynamic range of which is expanded, by composing the first image and the second image; a generation unit configured to generate tone compression characteristics based on the first image and an image generated by reducing a resolution of the first image; and a tone compression unit configured to compress tones of the composed image using the tone compression characteristics generated by the generation unit.

Also, according to another aspect of the present invention, there is provided an image capture apparatus, which generates an image, a dynamic range of which is expanded, by composing n (n is a natural number not less than 3) images having different exposure amounts, comprising: an imaging unit configured to continuously output images obtained by imaging operations which sequentially apply n different exposure amounts; a composing unit configured to obtain a composed image, a dynamic range of which is expanded, by sequentially composing n images continuously output from the imaging unit; a generation unit configured to generate tone compression characteristics based on an intermediate composed image obtained in a stage before an (n−1)-th stage by the composing unit, and an image generated by reducing a resolution of the intermediate composed image; and a tone compression unit configured to compress tones of the composed image obtained by the composing unit using the tone compression characteristics generated by the generation unit.

Also, according to another aspect of the present invention, there is provided an image processing apparatus, which generates an image, a dynamic range of which is expanded, by composing two images having different exposure amounts, comprising: a composing unit configured to generate a composed image, a dynamic range of which is expanded, by composing a first image and a second image which follows the first image, the first image and second image being obtained by imaging operations that sequentially apply two different exposure amounts; a generation unit configured to generate tone compression characteristics based on the first image and an image generated by reducing a resolution of the first image; and a tone compression unit configured to compress tones of the composed image using the tone compression characteristics generated by the generation unit.

Furthermore, according to another aspect of the present invention, there is provided an image processing apparatus, which generates an image, a dynamic range of which is expanded, by composing n (n is a natural number not less than 3) images having different exposure amounts, comprising: a composing unit configured to obtain a composed image, a dynamic range of which is expanded, by sequentially composing n images obtained by imaging operations which sequentially apply n different exposure amounts; a generation unit configured to generate tone compression characteristics based on an intermediate composed image obtained in a stage before an (n−1)-th stage by the composing unit, and an image generated by reducing a resolution of the intermediate composed image; and a tone compression unit configured to compress tones of the composed image obtained by the composing unit using the tone compression characteristics generated by the generation unit.

Further features of the present invention will become apparent from the following description of exemplary embodiments with reference to the attached drawings.

BRIEF DESCRIPTION OF THE DRAWINGS

FIG. 1 is a block diagram showing the arrangement of an image capture apparatus according to the first and second embodiments;

FIG. 2 is a block diagram showing the arrangement of a tone compression characteristics generation unit;

FIG. 3 is a timing chart showing image composing processing according to the first embodiment;

FIGS. 4A and 4B are views showing examples of brightness distributions of images to be captured;

FIG. 5 is a table for explaining features when tone compression characteristics are generated using a low-exposure image or high-exposure image;

FIGS. 8A and 8B include a block diagram and a graph, respectively, showing an example of the arrangement of a composing unit according to the second embodiment;

FIGS. 10A to 10D are views for explaining adverse effects upon generation of tone compression characteristics using a high-exposure image;

FIGS. 11A to 11D are views for explaining adverse effects upon generation of tone compression characteristics using a low-exposure image;

FIG. 12 is a table for explaining the relationship between adverse effects and types of images used to generate tone compression characteristics;

FIG. 16 is a graph showing an example of tone compression characteristics; and

FIG. 17 is a view showing a pixel layout example of an image sensing device.

DESCRIPTION OF THE EMBODIMENTS

Figure 6:
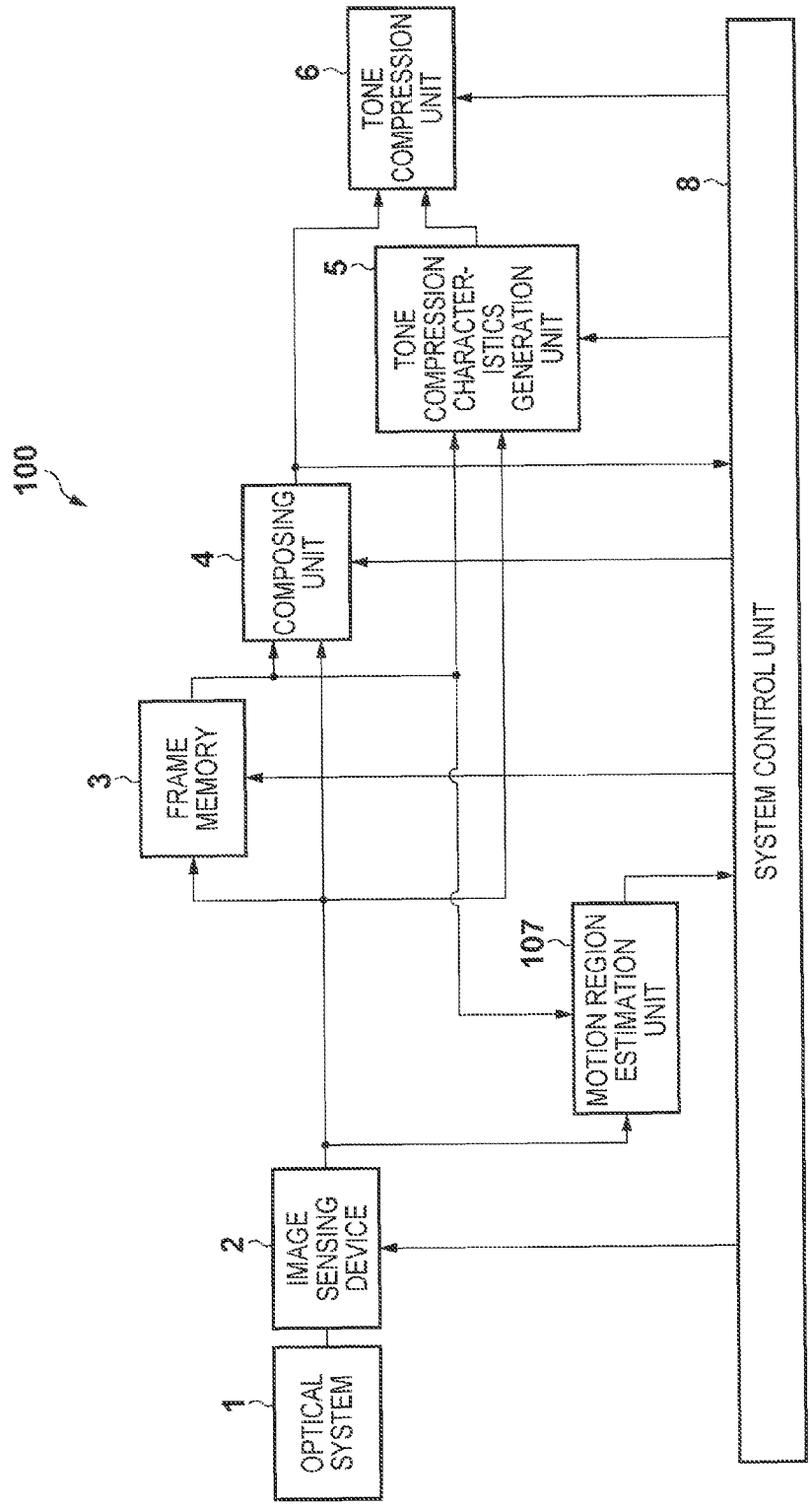
FIG. 6 is a block diagram showing an example of the arrangement of an image capture apparatus according to the second embodiment.

Preferred embodiments of the present invention will be described hereinafter with reference to the accompanying drawings.

First Embodiment

The first embodiment will explain an image capture apparatus having an image processing apparatus, which composes images of two frames having different exposure amounts and outputs an image for one frame, a dynamic range of which is broadened.

FIG. 1 is a block diagram showing the arrangement of an image capture apparatus 100 of the first embodiment. Referring to FIG. 1, an optical system 1 includes optical elements such as an imaging lens and stop. An image sensing device 2 converts an optical image formed on an imaging surface by the optical system 1 into an electrical signal, and outputs an image signal. In this embodiment, the image sensing device 2 can perform imaging operations while switching a plurality of types of exposure amounts, and switching of exposure amounts is attained by, for example, switching charge accumulation times in photoelectric conversion elements. A frame memory 3 is a memory used to buffer an image for one frame output from the image sensing device 2. A composing unit 4 composes an image read out from the frame memory 3 and an image of a current frame output from the image sensing device 2 by a predetermined calculation, thereby generating an image having a broad dynamic range. A tone compression characteristics generation unit 5 generates tone compression characteristics for the image composed by the composing unit 4. A tone compression unit 6 executes tone compression using the tone compression characteristics output from the tone compression characteristics generation unit 5, so that the output image of the composing unit 4 falls within a predetermined dynamic range. An image analyzing unit 7 analyzes an image output from the image sensing device 2 to determine which of images having two different exposure amounts output from the image sensing device 2 is to be used to generate the tone compression characteristics. A system control unit 8 controls the operation of the overall image capture apparatus 100.

An overview of the operation of the image capture apparatus 100 according to the first embodiment will be described below. When an imaging operation is started in the image capture apparatus 100, the system control unit 8 controls the optical system 1 and image sensing device 2 so that an image having an instructed exposure amount is output from the image sensing device 2 for each frame. The image output from the image sensing device 2 via the optical system 1 is input to the frame memory 3, composing unit 4, tone compression characteristics generation unit 5, and image analyzing unit 7. The frame memory 3 holds an output image for one frame from the image sensing device 2.

The composing unit 4 composes an image held in the frame memory 3 and that output from the image sensing device 2 so as to expand a dynamic range. As a result, an output image of the immediately preceding frame of the image sensing device 2, which image is read out from the frame memory 3, and an output image of the current frame of the image sensing device 2, which image is currently output from the image sensing device 2, are composed. The output image of the immediately preceding frame of the image sensing device 2, which is read out from the frame memory 3, and that of the current frame from the image sensing device 2 have different exposure amounts. For this reason, level adjustment of output images of the current frame and immediately preceding frame of the image sensing device 2 is executed by applying gain processing according to a difference between the exposure amounts before composing.

The tone compression characteristics generation unit 5 generates tone compression characteristics required to apply tone compression to an output image of the composing unit 4 using the output image of the immediately preceding frame, which is read out from the frame memory 3, and that of the current frame from the image sensing device 2. The tone compression unit 6 applies tone compression to the image output from the composing unit 4 using the tone compression characteristics output from the tone compression characteristics generation unit 5, so that an image to be captured has preferable tone representation, and falls within a dynamic range of an output video format.

The arrangement of the tone compression characteristics generation unit 5 will be described below with reference to FIG. 2. The tone compression characteristics generation unit 5 determines tone compression characteristics for each pixel with reference to a brightness level of a small region including a pixel of interest.

Referring to FIG. 2, an output image of the frame memory 3 is input to an input terminal 58, and that of the image sensing device 2 is input to an input terminal 59. Brightness generation units 51 and 52 generate brightness signals of the images input from the input terminals 58 and 59, respectively. Both of the output image of the frame memory 3 and that of the image sensing device 2 are RAW data, and have level differences for respective pixels due to a color filter (for example, RGB Bayer). Therefore, the brightness generation units 51 and 52 execute interpolation processing and matrix calculations to generate brightness signals free from level differences due to the color filter.

An image reduction unit 53 reduces a brightness image for one frame, which is output from the brightness generation unit 52, at a high reduction ratio such as ×1/64 or ×1/128 to acquire an image, the resolution of which is reduced, and stores the reduction result in a memory 54 as a second memory. Note that the memory 54 which stores the reduced image (resolution-reduced image) has a capacity sufficiently smaller than the frame memory 3 which buffers an input image for one frame, and a load on the image capture system is negligible even when the memory 54 is used. The frame memory 3 and memory 54 may be independent memories, but they may be different memory areas of a single memory. An image enlargement unit 55 enlarges the reduced image stored in the memory 54 using linear interpolation or the like so as to have an image size equal to that of the brightness image output from the brightness generation unit 51.

A local brightness estimation unit 56 estimates a brightness level of a small region including a pixel of interest by calculations using a high-resolution brightness image output from the brightness generation unit 51 and a low-resolution brightness image output from the image enlargement unit 55. As an example of such estimation calculations, the following method may be used. That is, outputs of a plurality of images having different resolutions are compared for each pixel;

when a difference between high- and low-resolution images is small, the output of the low-resolution image is output as a brightness level at a pixel of interest; and when the difference between the high- and low-resolution images is large, the low- and high-resolution images are weighted and added, and a result is output as a brightness level at the pixel of interest. Using such estimation calculations, the separation precision of each region can be enhanced in an image including small regions of various brightness levels, as shown in FIG. 4A or 4B, while eliminating the influences of noise, object edges, and the like. Note that this embodiment estimates local brightness levels using images of two different resolutions. However, the present invention is not limited to this, and images of three or more different resolutions may be used.

A tone compression characteristics determination unit 57 determines appropriate tone compression characteristics for each pixel with reference to the output of the local brightness estimation unit 56. For example, when the brightness level of a small region including a pixel of interest is lower than a proper exposure level, tone compression characteristics are generated to gain up the brightness level of the pixel of interest; or when the brightness level of the small region including the pixel of interest is higher than the proper exposure level, tone compression characteristics are generated to gain down the brightness level of the pixel of interest.

The local brightness estimation unit 56 has to refer to the low- and high-resolution images at the same timing. Therefore, the high-resolution image for one frame has to be buffered and delayed while the image reduction unit 53 reduces the image for one frame. Such image buffering increases a system load on the image capture apparatus especially when an image size is large or when a frame rate of a captured image is high. Hence, the image capture apparatus 100 of this embodiment shares the frame memory 3 used for the composing unit 4 as a delay adjustment buffer for the tone compression characteristics generation unit 5, thus preventing a system load from increasing.

On the other hand, the frame memory 3 used for the composing unit 4 can buffer an image for one frame. In this embodiment, when low- and high-exposure images are to be composed, an image which is captured first of images of two frames of the low- and high-exposure images, that is, an image of the first frame is buffered in the frame memory 3. Then, an image of the second frame which is output next from the image sensing device 2, and the image of the first frame buffered in the frame memory 3 are composed. As described above, the images of the two frames are those which are captured while being applied with different exposure amounts by the optical system 1 and image sensing device 2. Therefore, when the image which is buffered for the purpose of composing is shared by the tone compression characteristics generation unit 5, the image of the first frame before composing, that is, one of low- and high-exposure images before composing is held in the frame memory, and tone compression characteristics are generated for this image.

FIG. 5 shows merits and demerits when each of low- and high-exposure images is used to generate the tone compression characteristics. Since a low-exposure image has an S/N of a dark part lower than a high-exposure image, but that S/N is not saturated even in a bright part, when the tone compression characteristics are generated using the low-exposure image, the tone compression characteristics over all the brightness regions from the dark part to the bright part can be generated. On the other hand, in the high-exposure image, tone compression characteristics cannot be generated for a saturated region of a bright part, but the S/N of a dark part is higher than the low-exposure image. Hence, when tone compression characteristics are generated using the high-exposure image, the tone compression characteristics having a high S/N of the dark part can be generated. That is, the tone compression characteristics generated using the low-exposure image are suited to the bright part, and those generated using the high-exposure image are suited to the dark part.

Thus, the image capture apparatus 100 of this embodiment determines whether a dominant brightness region in an image to be captured is a dark part, as shown in FIG. 4A, or a bright part, as shown in FIG. 4B. An image to be used by the tone compression characteristics generation unit 5, that is, an image to be held by the frame memory 3 is determined so that tone compression processing is executed for at least the dominant brightness region in the image to be captured using preferred tone compression characteristics.

As a method of determining a dominant brightness region in an image to be captured, the image analyzing unit 7 may analyze the brightness distribution of the image to be captured to determine the dominant brightness region, as will be described below, or the system control unit 8 may determine that region with reference to, for example, imaging conditions such as an exposure setting, user instructions, and the like. The operation of the image analyzing unit 7 which analyzes the brightness distribution in an image to determine whether a dark or bright part is dominant in the image will be described below.

As an example of the analyzing method in the image analyzing unit 7, a method of calculating, for respective predetermined brightness levels, areas of pixel regions having the corresponding brightness levels, and determining a brightness level corresponding to the largest area as a dominant brightness level may be used. In this case, when the dominant brightness level is lower than a predetermined threshold, it is determined that a dark part is dominant in an image to be captured. When the dominant brightness level is higher than the predetermined threshold, it is determined that a bright part is dominant in an image to be captured.

As another analyzing method of the image analyzing unit 7, a brightness average value is calculated in a pixel region which is located at the center of a frame and has a predetermined size. When the average brightness of that pixel region is lower than a predetermined value, it is determined that a dark part is dominant in an image to be captured. When the average brightness of that pixel region is higher than the predetermined value, it is determined that a bright part is dominant in an image to be captured.

Furthermore, as still another analyzing method of the image analyzing unit 7, whether or not a specific object such as a face or pet is included in a frame is detected based on brightness levels, colors, motions, edge amounts, and the like of an image, and an average brightness of the specific object region is calculated. When the average brightness of the specific object region is lower than a predetermined value, it is determined that a dark part is dominant in an image to be captured. When the average brightness of the specific object region is higher than the predetermined value, it is determined that a bright part is dominant in an image to be captured.

As described above, the image analyzing unit 7 analyzes an image to be captured, and outputs the analysis result to the system control unit 8. The system control unit 8 controls driving of the image sensing device 2 based on the analysis result output of the image analyzing unit 7. For example, as a result of analysis of the image analyzing unit 7, when it is determined that a dark part is dominant in an image to be captured, the system control unit 8 controls the frame memory 3 to hold a high-exposure image. In this embodiment, the system control unit 8 controls driving of the image sensing device 2 for an image including a dominant dark part to capture an image having a higher exposure amount earlier of images of two continuous frames to be composed. On the other hand, as a result of analysis of the image analyzing unit 7, when it is determined that a bright part is dominant in an image to be captured, the system control unit 8 controls the frame memory 3 to hold a low-exposure image. In this embodiment, the system control unit 8 controls driving of the image sensing device 2 to capture an image having a lower exposure amount earlier of images of two continuous frames to be composed.

An example of imaging operations when a dominant region changes from a bright part to a dark part in an image to be captured will be described below with reference to the timing chart shown in FIG. 3. In FIG. 3, an interval between neighboring times t1, t2, t3, . . . , t7 indicates a 1-frame period (to be described as "1V" hereinafter). The image sensing device 2 outputs a low- or high-exposure image for 1V, and images to be composed by the composing unit 4 correspond to combinations bounded by the broken lines in FIG. 3.

That is, during a period from time t1 to time t3, a low-exposure image L1 and high-exposure image H1 output from the image sensing device 2 are composed to generate a composed image (H1+L1). Likewise, during a period from time t3 to time t5, a low-exposure image L2 and high-exposure image H2 output from the image sensing device 2 are composed. Also, during a period from time t5 to time t7, a low-exposure image L3 and high-exposure image H3 output from the image sensing device 2 are composed.

Control signals S1 to S3 are those which are controlled and output by the system control unit 8. The control signal S1 is a binary control signal used to control an image write access to the frame memory 3 and ON/OFF of processing in the tone compression characteristics generation unit 5. When the control signal S1 is "1", an output image of the image sensing device 2 is written in the frame memory 3 by spending a 1V period. At the same time, an output image of the image sensing device 2 is input to the tone compression characteristics generation unit 5, and a reduced image of that output image is generated and is held in the memory 54 by spending a 1V period. When the control signal S1 is "0", an image write access to the frame memory 3 is stopped, and the tone compression characteristics generation unit 5 generates tone compression characteristics using the image held in the frame memory 3 and the reduced image held in the memory 54, and sequentially outputs the generated characteristics.

The control signal S2 is a binary signal used to control an image read access from the frame memory 3, ON/OFF of processing in the composing unit 4, and ON/OFF of processing in the tone compression unit 6. When the control signal S2 is "0", an image read access from the frame memory 3 is stopped, and the processes in the composing unit 4 and tone compression unit 6 are disabled. When the control signal S2 is "1", an image held in the frame memory 3 is read out. Then, the composing unit 4 executes composing processing for expanding a dynamic range using an image of the current frame output from the image sensing device 2 and the image (an image of a frame immediately before the current frame) which is read out from the frame memory 3. Then, the tone compression unit 6 applies tone compression processing to the composed image sequentially output from the composing unit 4 using the tone compression characteristics sequentially output from the tone compression characteristics generation unit 5.

The control signal S3 is a binary control signal used to determine which of images of two frames to be composed, that is, low- and high-exposure images is to be captured by the image sensing device 2 earlier. The control signal S3 is updated based on, for example, the analysis result of the image analyzing unit 7. The control signal S3 is set to be "0" when it is determined as a result of analysis of the image analyzing unit 7 that a bright part is dominant in an image to be captured. When the control signal S3 is "0", the image sensing device 2 is controlled to capture a low-exposure image earlier upon capturing next images to be composed. On the other hand, the control signal S3 is set to be "1" when it is determined as a result of analysis of the image analyzing unit 7 that a dark part is dominant in an image to be captured. When the control signal S3 is "1", the image sensing device 2 is controlled to capture a high-exposure image earlier upon capturing next images to be composed.

Referring to FIG. 3, during a period from time t1 to time t2, since the control signal S3 is "0", images of two frames to be composed are output from the image sensing device 2 in an order of the low-exposure image L1 as the first frame and the high-exposure image H1 as the second frame. Then, during a 1V period from time t1 to time t2, the low-exposure image L1 is written in the frame memory 3, and a reduced image of the low-exposure image L1 is generated and is held in the memory 54 parallel to the image write access. During a period from time t2 to time t3, the composing unit 4 composes the low-exposure image L1 written in the frame memory 3 and the high-exposure image H1 output from the image sensing device 2, and outputs an image H1+L1. Parallel to this processing, the tone compression characteristics generation unit 5 sequentially generates tone compression characteristics g(L1) from the low-exposure image L1 held in the frame memory 3 and the reduced image held in the memory 54. Then, the tone compression unit 6 applies tone compression processing to the composed image H1+L1 using the tone compression characteristics g(L1), thus generating a final image.

During a period from time t1 to time t3, the image analyzing unit 7 analyzes the low-exposure image L1, which is captured earlier, of the low-exposure image L1 and high-exposure image H1 to be composed, and outputs an analysis result A(L1). Then, the system control unit 8 updates the control signal S3 to be referred to in composing processing from time t3 to "0" based on the analysis result A(L1). This is because since it is determined as a result of analysis of an image to be captured that a bright part is dominant, a low-exposure image is captured earlier in case of the next composing processing, and tone compression characteristics for the bright part are optimized to obtain preferred image quality.

During a period from time t3 to time t5 as well, since the control signal S3 is "0", images of two frames to be composed are output from the image sensing device 2 in an order of the low-exposure image L2 and the high-exposure image H2. Then, during a 1V period from time t3 to time t4, the low-exposure image L2 is written in the frame memory 3, and a reduced image of the low-exposure image L2 is generated and is held in the memory 54 parallel to the image write access. During a period from time t4 to time t5, the composing unit 4 composes the low-exposure image L2 written in the frame memory 3 and the high-exposure image H2 output from the image sensing device 2, and outputs an image H2+L2. Parallel to this processing, the tone compression characteristics generation unit 5 sequentially generates tone compression characteristics g(L2) from the low-exposure image L2 held in the frame memory 3 and the reduced image held in the memory 54. Then, the tone compression unit 6 applies tone compression processing to the composed image H2+L2 using the tone compression characteristics g(L2), thus generating a final image.

During a period from time t3 to time t5, the image analyzing unit 7 analyzes the low-exposure image L2, which is captured earlier, of images of two frames to be composed, that is, the low-exposure image L2 and high-exposure image H2, and outputs an analysis result A(L2). Assume that the image analyzing unit 7 determines in turn that a dark part is dominant. In this case, since it is determined as a result of analysis of an image to be currently captured that a dark part becomes dominant, a high-exposure image is captured earlier in case of the next composing processing, and tone compression characteristics for the dark part are optimized to obtain preferred image quality. For this reason, the system control unit 8 updates the control signal S3 to be referred to by composing processing from time t5 to "1" based on A(L2).

During a period from time t5 to time t7, since the control signal S3 is "1", images of two frames to be composed are output from the image sensing device 2 in an order of the high-exposure image H3 and the low-exposure image L3. Then, during a 1V period from time t5 to time t6, the high-exposure image H3 is written in the frame memory 3, and a reduced image of the high-exposure image H3 is generated and is held in the memory 54 parallel to that image write access. During a period from time t6 to time t7, the composing unit 4 composes the high-exposure image H3 written in the frame memory 3 and the low-exposure image L3 output from the image sensing device 2, and outputs an image H3+L3. Then, parallel to this processing, the tone compression characteristics generation unit 5 sequentially generates tone compression characteristics g(H3) using the high-exposure image H3 held in the frame memory 3 and the reduced image held in the memory 54. The tone compression unit 6 applies tone compression processing to the composed image H3+L3 using the tone compression characteristics g(H3), thus generating a final image.

During a period from time t5 to time t7, the image analyzing unit 7 analyzes the high-exposure image H3, which is captured earlier, of the two frames to be composed, that is, the low-exposure image L3 and high-exposure image H3, and outputs an analysis result A(H3). Then, the system control unit 8 updates the control signal S3 to be referred to in composing processing from time t7 to "1" based on this analysis result A(H3). This is because since it is determined as a result of analysis of an image to be currently captured that a dark part is dominant, a high-exposure image is also captured earlier in case of the next composing processing, and tone compression characteristics for the dark part are optimized to obtain preferred image quality.

By executing the aforementioned series of imaging control operations, a plurality of images having different exposure amounts are composed, and tone compression is executed using tone compression characteristics suited to the composed image, thus outputting a video signal.

As described above, the image capture apparatus 100 of this embodiment can generate tone compression characteristics for a composed image using the same image as that to be buffered in the frame memory 3 so as to execute composing processing for generating an image with a broad dynamic range. For this reason, an increase in system load due to memory accesses can be avoided. Since an image to be used to generate tone compression characteristics is determined by analyzing features of an image to be captured, tone compression processing suited to the image to be captured can be executed.

Note that this embodiment determines whether a bright or dark part is dominant by analyzing a first image. However, the present invention is not limited to this. For example, whether a bright or dark part is dominant may be determined from states of a shutter speed, automatic exposure result, and the like in place of image analysis.

Second Embodiment

In the first embodiment, whether a bright or dark part is dominant in an image is determined to switch exposure amounts to be applied to first and second frames. However, the exposure amount setting is not limited to such specific condition. For example, when tone compression is applied to a moving image, a dynamic range of which is expanded, appropriate tone compression characteristics change when a dynamic part and static part in an image change.

Therefore, according to the second embodiment, when composing processing for expanding a dynamic range is executed, compression using appropriate tone compression characteristics according to a change (motion) of an image in a moving image is implemented while suppressing an increase in load on a system as in the first embodiment.

FIG. 6 is a block diagram showing the arrangement of an image capture apparatus 100 according to the second embodiment. In FIG. 6, the same reference numerals denote the same components as in the first embodiment (FIG. 1). In the arrangement shown in FIG. 6, the image analyzing unit 7 in the arrangement shown in FIG. 1 is replaced by a motion region estimation unit 107. The motion region estimation unit 107 estimates a part where a motion has occurred from images to be composed (in this embodiment, images of two frames having different exposure amounts) output from the image sensing device 2 and an image stored in the frame memory 3.

The arrangement of the composing unit 4 according to the second embodiment will be described below with reference to FIGS. 8A and 8B. As described above, the composing unit 4 composes an image read out from the frame memory 3 and that output from the image sensing device 2, thereby generating an image with a broad dynamic range. In FIG. 8A, an output image of the frame memory 3 is input to an input terminal 43, and that from the image sensing device 2 is input to an input terminal 44.

A motion pixel determination unit 41 detects a region in which an object has moved by comparing two images input from the input terminals 43 and 44, that is, images of two frames to be composed. The detection result is output to an image composing unit 42 and the system control unit 8. The motion pixel determination unit 41 executes, for example, level matching of brightness values between images, and calculates an absolute value of a difference between pixel values of corresponding pixels, that is, pixels at the same image coordinates. Pixels having the absolute values of the differences, which are equal to or larger than a given threshold, are determined as those of a motion part (to be referred to as motion pixels hereinafter), and other pixels are determined as those of a still part (to be referred to as still pixels hereinafter).

The image composing unit 42 composes the images input from the input terminals 43 and 44, that is, the images of the two frames to be composed based on the determination output of the motion pixel determination unit 41. Note that the a composing timing is given by a control signal S2 input from the system control unit 8 (to be described later using FIG. 7).

FIG. 8B shows a relation 411 between object brightness levels and output values in a high-exposure image, and a relation 412 between object brightness levels and output values in a low-exposure image. Since the low-exposure image has an S/N of a dark part 401 lower than the high-exposure image, but that S/N is not saturated even in a bright part 402, as indicated by the relation 412, image information over all brightness regions from the dark part 401 to the bright part 402 can be obtained. On the other hand, in the high-exposure image, as indicated by the relation 411, although highlight detail loss occurs in the saturated region of the bright part 402, the S/N of the dark part 401 is higher than that of the low-exposure image. Therefore, the low-exposure image free from any omission of image information is used for the bright part 402, and either the low- or high-exposure image may be used for the dark part 401.

However, use of the high-exposure image for pixels determined as motion pixels in the dark part 401 should be avoided. This is because since determination of motion pixels refers to difference values between the low- and high-exposure images, when highlight detail loss has occurred in the high-exposure image, even pixels which are not motion pixels generate larger differences from the low-exposure image, and are often determined as motion pixels. When the high-exposure image is used for motion pixels determined in this way, that portion may suffer highlight detail loss. Therefore, the image composing unit 42 of this embodiment uses the low-exposure image for motion pixels in the dark part 401 and the high-exposure image for still pixels in the dark part 401.

As in the first embodiment, since the frame memory 3 used for the composing unit 4 is commonly used as a delay adjustment buffer for the tone compression characteristics generation unit 5, an increase in system load is prevented.

As in the first embodiment, the frame memory 3 used for the composing unit 4 can buffer an image for one frame. An image for one frame as one of low- and high-exposure images before composing is held in the frame memory 3, and tone compression characteristics are generated based on this image.

In this case, when the tone compression characteristics are generated using one of low- and high-exposure images before composing, if the image includes a moving object, the tone compression characteristics which are not proper for the composed image may often be generated. FIGS. 10A to 10D and FIGS. 11A to 11D show examples.

A case will be described below with reference to FIGS. 10A to 10D wherein the tone compression characteristics are generated from a high-exposure image. A high-exposure image shown in FIG. 10A includes objects 601 and 602. By contrast, in a low-exposure image shown in FIG. 10B, assume that the object 601 remains still at the same position, but the object 602 has largely moved to a position of an object 603.

When these high- and low-exposure images are composed by the composing unit 4, since a region of the object 601 is determined as still pixels, a high-exposure image is used in composing processing for an image in which the region of the object 601 belongs to the dark part 401. On the other hand, since regions of the objects 602 and 603 are determined as motion pixels, a low-exposure image is used in composing processing even for an image in which the regions of the objects 602 and 603 belong to the dark part 401. As a result, as shown in FIG. 10D, a composed image includes the objects 601 and 603 and a ghost 604 which is generated since the low-exposure image is used for the region of the object 602.

At this time, when the tone compression characteristics are generated from the high-exposure image, optimal tone compression characteristics are generated for the objects 601 and 602, as shown in FIG. 10C. When the generated tone compression characteristics are applied to a composed image (FIG. 10D), tone compression characteristics for a region 605 are correctly applied to the object 601. However, tone compression characteristics for a region 606 are erroneously applied to the ghost 604, and appropriate tone compression characteristics cannot be applied to the object 603.

A case will be examined below with reference to FIGS. 11A to 11D wherein tone compression characteristics are generated from a low-exposure image. A low-exposure image shown in FIG. 11A includes objects 701 and 702. By contrast, in a high-exposure image shown in FIG. 11B, assume that the object 701 remains still at the same position, but the object 702 has slightly moved to a position of an object 703.

When these high- and low-exposure images are composed by the composing unit 4, since a region of the object 701 is determined as still pixels, a high-exposure image is used in composing processing for an image in which the region of the object 701 belongs to the dark part 401. On the other hand, regions of the objects 702 and 703 are determined as still pixels since their moving amount is very small and does not exceed the threshold required to determine a motion in the motion pixel determination unit 41. As a result, a high-exposure image is used in composing processing for an image in which the regions of the objects 702 and 703 belong to the dark part 401. As a result, a composed image includes the objects 701 and 703, as shown in FIG. 11D.

At this time, when tone compression characteristics are generated from the low-exposure image shown in FIG. 11A, optimal tone compression characteristics for the objects 701 and 702 are generated, as shown in FIG. 11C. When the generated tone compression characteristics are applied to a composed image shown in FIG. 11D, tone compression characteristics of a region 704 are correctly applied to the object 701. However, tone compression characteristics of a region 705 are applied to the object 703 while being shifted slightly, thus losing tones of a shifted part.

A table shown in FIG. 12 summarizes conditions which cause the aforementioned problems. The table shown in FIG. 12 shows composing processing in the dark part 401 (that in a region for which either the high- or low-exposure image can be used in composing processing). In the table, L is a low-exposure image, H is a high-exposure image, and ΔLH is an absolute value of a difference between pixel values associated with pixels at certain identical image coordinates on the low- and high-exposure images. ○ in the table indicates that tone compression characteristics are proper for a composed image, and x indicates that tone compression characteristics are improper. Δ indicates that tone compression characteristics are improper as in x but the influence of a trouble caused by the improper tone compression characteristics is small.

When ΔLH is larger than a certain threshold, that pixel is determined as a motion pixel, and the low-exposure image (L) is used for a composed image. When ΔLH is nearly zero, that pixel is determined as a still pixel, and the high-exposure image (H) is used for a composed image. When ΔLH is not zero but is smaller than the certain threshold, that pixel is determined as a still pixel, and the high-exposure image (H) is also used for a composed image in this case. The tone compression characteristics are improper for a composed image when L is used for the composed image and tone compression characteristics are generated from H (FIGS. 10A to 10D) and when H is used for the composed image and tone compression characteristics are generated from L (FIGS. 11A to 11D).

The arrangement for further eliminating cases of improper tone compression characteristics for a composed image will be described below. In this embodiment, when a region determined to have a motion (motion region) is dominant in an image to be captured, that is, when a region for which a low-exposure image is used is dominant in a composed image, tone compression characteristics are generated from the low-exposure image. On the other hand, when a region determined to remain still (still region) is dominant in an image to be captured, that is, when a region for which a high-exposure image is used is dominant in a composed image, tone compression characteristics are generated from the high-exposure image.

For this purpose, the image capture apparatus 100 of this embodiment determines whether a dominant region in an image to be captured is a motion or still region. Then, an image used by the tone compression characteristics generation unit 5, that is, that to be held in the frame memory 3 is determined so that tone compression processing is executed for at least a dominant region in an image to be captured using more preferable tone compression characteristics.

As a method of determining a dominant region in an image to be captured, the motion region estimation unit 107 may analyze the image to be captured to determine such region, as will be described later, or the system control unit 8 may determine that region with reference to, for example, imaging conditions, user instructions, and the like. As a method of determining a dominant region with reference to imaging conditions, when a shutter speed is high, or when a scene mode is a sports mode, since a moving object is more likely to be captured, it is determined that a motion region is dominant. By contrast, when a shutter speed is low, or a tripod imaging mode is set, since a still object is more likely to be captured, it is determined that a still region is dominant. As a method of determining a dominant region with reference to user instructions, for example, a still region dominant mode and motion region dominant mode are prepared in advance, and are selected by the user before imaging. The operation of the motion region estimation unit 107 will be described below.

The motion region estimation unit 107 detects a motion vector distribution in a frame, and determines whether a motion or still region is dominant. As an example of the determination method, motion vectors are calculated for respective blocks by block matching, and magnitudes of these motion vectors are integrated. When the integrated value is larger than a certain threshold, it is determined that a motion region is dominant. When the integrated value is smaller than the certain threshold, it is determined that a still region is dominant. The motion region estimation unit 107 analyzes an image to be captured in this way, and outputs the analysis result to the system control unit 8.

The system control unit 8 swaps exposure amounts of images of first and second frames in two frames to be composed based on the estimation result of the motion region estimation unit 107. This swapping controls to select whether an image of the first frame used to generate tone compression characteristics is a low- or high-exposure image. In this embodiment, the system control unit 8 controls driving of the image sensing device 2 to swap an order of two different exposure amounts to be applied to the image sensing device 2.

As a result of estimation of the motion region estimation unit 107, when the magnitude of a part where a motion has occurred in an image to be captured is equal to or smaller than a predetermined value, that is, when it is determined that a still region is dominant, a high-exposure image is controlled to be input to the frame memory 3. In this embodiment, the system control unit 8 controls driving of the image sensing device 2 to capture an image with a high exposure amount of images of two continuous frames to be composed earlier as the first frame. On the other hand, as a result of estimation of the motion region estimation unit 107, when the magnitude of a part where a motion has occurred in an image to be captured exceeds the predetermined value, that is, when it is determined that a motion region is dominant, a low-exposure image is controlled to be input to the frame memory 3. In this embodiment, the system control unit 8 controls driving of the image sensing device 2 to capture an image with a low exposure amount of images of two continuous frames to be composed earlier as the first frame.

With the aforementioned arrangement, proper tone compression characteristics can be obtained. However, with the aforementioned control, proper tone compression characteristics can be obtained for a dominant region of either a motion or still region, but proper tone compression characteristics are unlikely to be obtained for the other non-dominant region. Hence, the tone compression unit 6 of this embodiment further controls a degree of tone compression effect according to a product of an area and moving amount of a motion region, so as to reduce the influence of improper tone compression for the non-dominant region.

A case will now be examined wherein a frame locally includes a motion region, but the motion region estimation unit 107 determines that a dominant region is a still region. In this case, tone compression characteristics are generated from a high-exposure image, and the situation described using FIGS. 10A to 10D may occur. In the situation shown in FIGS. 10A to 10D, as the area of the motion region is larger, or the moving amount of the motion region is larger, the influence of improper tone compression becomes more serious. Therefore, when it is determined that a dominant region is a still region, that is, when tone compression characteristics are generated from a high-exposure image, it is desired to weaken the tone compression effect with increasing product of the area and moving amount of the motion region.

A case will be examined below wherein a frame locally includes a motion region, but the motion region estimation unit 107 determines that a dominant region is a motion region. In this case, tone compression characteristics are generated from a low-exposure image, and the situation described using FIGS. 11A to 11D may occur. In the situation shown in FIGS. 11A to 11D, as the area of the motion region is larger or as the moving amount of the motion region is larger, the influence of improper tone compression becomes less serious. Therefore, when it is determined that a dominant region is a motion region, that is, when tone compression characteristics are generated from a low-exposure image, it is desired to strengthen the tone compression effect with increasing product of the area and moving amount of the motion region. This is because as the product of the area and moving amount of the motion region increases, a motion region becomes more dominant, and a ratio of a low-exposure image which occupies a composed image becomes higher. For example, when a motion region is 100%, tone compression characteristics generated from a low-exposure image are applied intact; when a motion region is 60%, tone compression characteristics are applied relatively weakly in consideration of a still region of 40%.

Figure 9A:
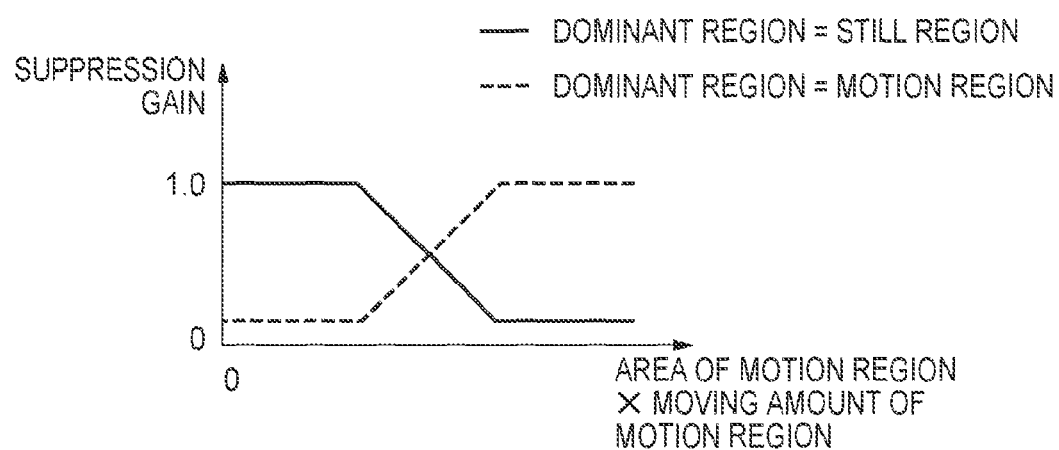
FIGS. 9A and 9B are graphs showing an example of a suppression gain generated by a tone compression unit according to the second embodiment.
Figure 9B:
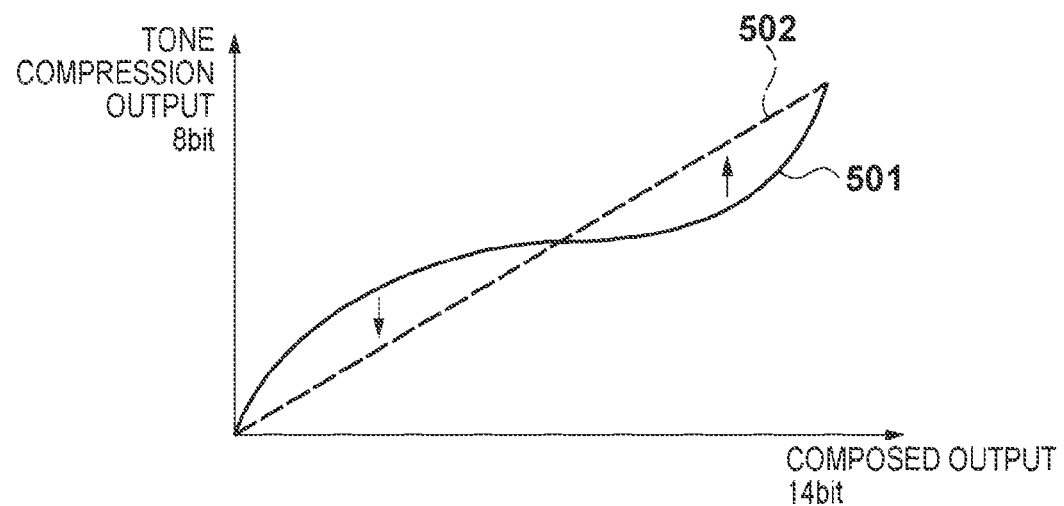

The degree of the tone compression effect is controlled by multiplying the output from the tone compression characteristics generation unit 5 by a suppression gain. FIG. 9A shows an example of characteristics of the suppression gain. As the product of the area and moving amount of the motion region as an abscissa increases, when a dominant region is a still region, the gain becomes smaller; when a dominant region is a motion region, the gain becomes larger. When the suppression gain is "1", the compression characteristics generated by the tone compression characteristics generation unit 5 are obtained. When the suppression gain is "0", linear compression characteristics are obtained. For example, when tone compression characteristics 501 are obtained by the tone compression characteristics generation unit 5, as shown in FIG. 9B, if the suppression gain is "1", the tone compression characteristics 501 are used intact. On the other hand, as the suppression gain gets closer to "0", the tone compression characteristics get closer to linear characteristics 502.

Effects obtained upon controlling the degree of the tone compression effect will further be described with reference to FIGS. 10A to 10D and FIGS. 11A to 11D. In FIG. 6, as described above, tone compression characteristics (FIG. 10C) generated from a high-exposure image are applied to a composed image shown in FIG. 10D. For this reason, proper tone compression is applied to the object 601, but proper tone compression is not applied to the ghost 604 and object 603. At this time, when the tone compression effect is suppressed in consideration of a non-dominant region, although the effect of the proper tone compression for the object 601 is weakened, adverse effects caused by improper tone compression to the ghost 604 and object 603 can be eliminated.

In FIGS. 11A to 11D as well, as described above, tone compression characteristics (FIG. 11C) generated from a low-exposure image are applied to a composed image shown in FIG. 11D. For this reason, proper tone compression is applied to the object 701, but proper tone compression is not applied to the object 703. At this time, when the tone compression effect is suppressed in consideration of a non-dominant region, adverse effects caused by improper tone compression to the object 703 can be eliminated.

Figure 7:
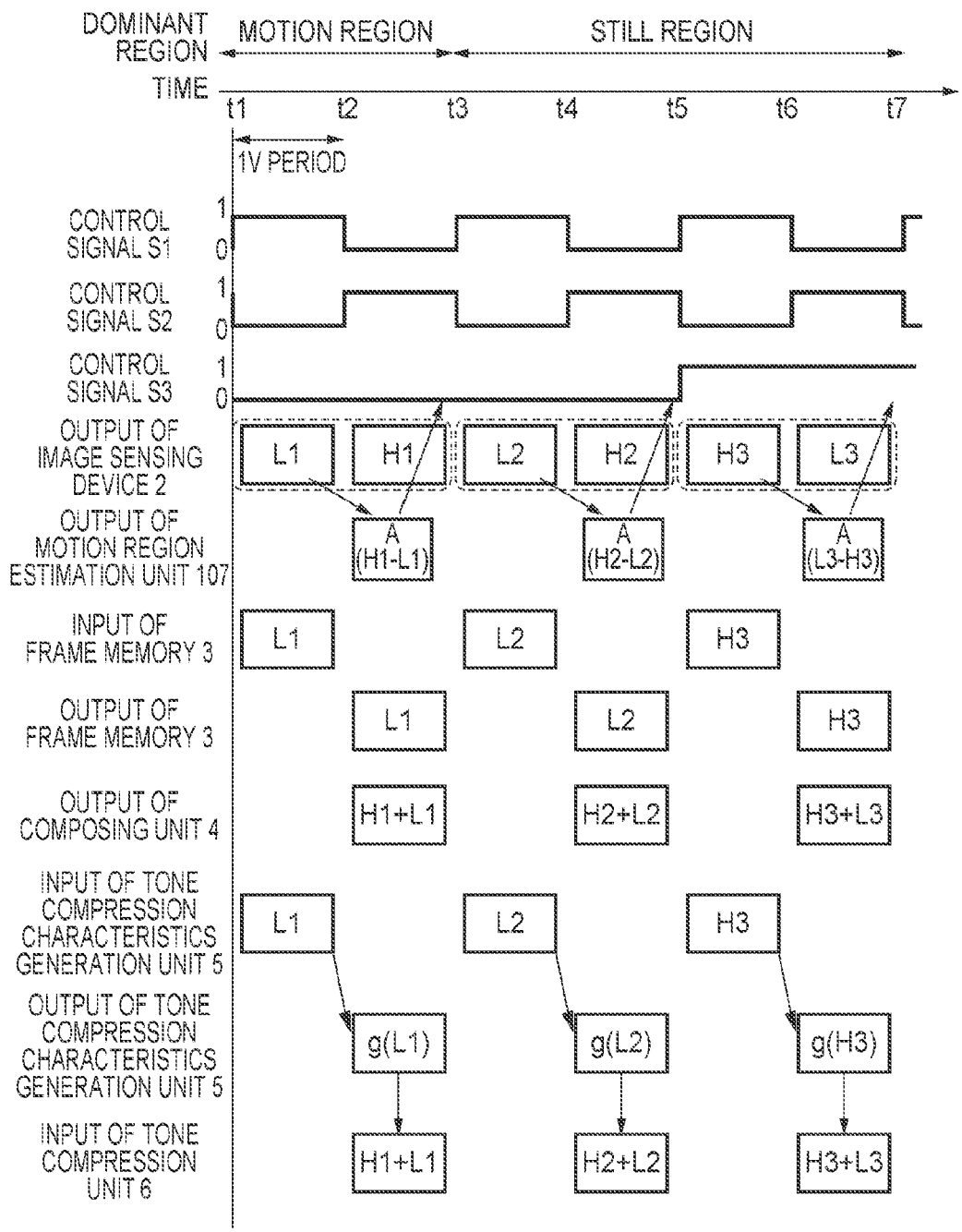
FIG. 7 is a timing chart showing the processing sequence of the image capture apparatus according to the second embodiment.

An example of imaging operations when a dominant region changes from a motion region to a still region in an image to be captured will be described below with reference to the timing chart shown in FIG. 7. In FIG. 7, an interval between neighboring times t1, t2, t3, . . . , t7 indicates a 1-frame period (to be described as "1V" hereinafter). The image sensing device 2 outputs a low- or high-exposure image for 1V, and images of two frames to be composed by the composing unit 4 correspond to combinations bounded by the broken lines in FIG. 7.

That is, during a period from time t1 to time t3, a low-exposure image L1 and high-exposure image H1 continuously output from the image sensing device 2 are composed. Likewise, during a period from time t3 to time t5, a low-exposure image L2 and high-exposure image H2 continuously output from the image sensing device 2 are composed. Also, during a period from time t5 to time t7, a low-exposure image L3 and high-exposure image H3 continuously output from the image sensing device 2 are composed.

A control signal S1 is a binary control signal used to control an image write access to the frame memory 3 and ON/OFF of processing in the tone compression characteristics generation unit 5, and is output from the system control unit 8. When the control signal S1 is "1", an output image of the image sensing device 2 is written in the frame memory 3 by spending a 1V period. Parallel to this, an output image of the image sensing device 2 is input to the tone compression characteristics generation unit 5, thereby generating tone compression characteristics by spending a 1V period. When the control signal S1 is "0", an image write access to the frame memory 3 is stopped, and the processing of the tone compression characteristics generation unit 5 is turned off.

A control signal S2 is a binary signal used to control an image read access from the frame memory 3, ON/OFF of processing in the composing unit 4, and ON/OFF of processing in the tone compression unit 6, and is output from the system control unit 8. When the control signal S2 is "0", an image read access from the frame memory 3 is stopped, and the processes in the composing unit 4 and tone compression unit 6 are turned off. When the control signal S2 is "1", the composing unit 4 executes composing processing for generating composed image, a dynamic range of which is expanded, using an image output from the image sensing device 2 and the image read out from the frame memory 3. Then, the tone compression unit 6 applies tone compression processing to the composed image using the output from the tone compression characteristics generation unit 5.

A control signal S3 is a binary control signal used to determine which of low- and high-exposure images to be composed is to be captured earlier, and is output from the system control unit 8. The system control unit 8 updates the control signal S3 based on the determination result of the motion region estimation unit 107.

When the system control unit 8 determines based on the determination result of the motion region estimation unit 107 that a motion region is dominant in an image to be captured, it sets the control signal S3 to be "0". When the control signal S3 is "0", the image sensing device 2 is controlled to capture a low-exposure image earlier at the next imaging timing of images to be composed. That is, the output order from the image sensing device 2 is controlled so that the first frame of frames to be composed is a low-exposure image, and the second frame is a high-exposure image. On the other hand, when the system control unit 8 determines based on the determination result of the motion region estimation unit 107 that a still region is dominant in an image to be captured, it sets the control signal S3 to be "1". When the control signal S3 is "1", the image sensing device 2 is controlled to capture a high-exposure image earlier at the next imaging timing of images to be composed. That is, the output order from the image sensing device 2 is controlled so that the first frame of frames to be composed is a high-exposure image, and the second frame is a low-exposure image.

In FIG. 7, since the control signal S3 is "0" during a period from time t1 to time t2, images of two frames to be composed are output from the image sensing device 2 in an order of the low-exposure image L1 and high-exposure image H1. Then, the system control unit 8 writes the low-exposure image L1 in the frame memory 3 during a 1V period from time t1 to time t2. Parallel to this, the tone compression characteristics generation unit 5 stores a reduced image of the low-exposure image L1 in the memory 54 until time t2.

During a period from time t2 to time t3, the composing unit 4 composes the low-exposure image L1 written in the frame memory 3 and the high-exposure image H1 output from the image sensing device 2, and outputs a composed image H1+L1. Parallel to this processing, the tone compression characteristics generation unit 5 generates tone compression characteristics g(L1) based on the reduced image of the image L1 held in the memory 54 and the image L1 read out from the frame memory 3, and sequentially outputs the generated tone compression characteristics. Then, during this period from time t2 to time t3, the tone compression unit 6 applies tone compression processing to the composed image H1+L1 output from the composing unit 4 using the tone compression characteristics g(L1).

During a period from time t1 to time t3, the motion region estimation unit 107 determines a motion region using the low-exposure image L1 and high-exposure image H1 to be composed, and outputs a determination result A(H1−L1). The system control unit 8 updates the control signal S3 to be referred to in composing processing from time t3 to "0" based on the determination result A(H1−L1). This is because since it is determined as a result of analysis of an image to be currently captured that a motion region is dominant, preferred image quality can be obtained by capturing a low-exposure image earlier in the next composing processing to optimize tone compression characteristics in the motion region.

In this case, the motion region estimation unit 107 has to output the determination result A(H1−L1) during the period from time t2 to time t3 in which the high-exposure image H1 (the image of the second frame of the frames to be composed) is output from the image sensing device 2. For this purpose, the motion region estimation unit 107 takes the following measure. For example, the high-exposure image H1 is decimated and read out from the image sensing device 2 twice (for example, in even and odd fields), and motion determination is executed at the completion timing of the first read access, or motion determination is executed in the middle of a read access of the high-exposure image H1 (that is, a motion region is determined from a partial image in place of a full image).

During a period from time t3 to time t5 as well, since the control signal S3 is "0", images of two frames to be composed are output from the image sensing device 2 in an order of the low-exposure image L2 (first frame) and high-exposure image H2 (second frame). Then, the system control unit 8 writes the low-exposure image L2 in the frame memory 3 during a 1V period from time t3 to time t4. Parallel to this, the tone compression characteristics generation unit 5 stores a reduced image of the low-exposure image L2 in the memory 54 until time t4.

During a period from time t4 to time t5, the composing unit 4 composes the low-exposure image L2 written in the frame memory 3 and the high-exposure image H2 output from the image sensing device 2, and outputs a composed image H2+L2. Parallel to this processing, the tone compression characteristics generation unit 5 generates tone compression characteristics g(L2) based on the reduced image of the image L2 held in the memory 54 and the image L2 read out from the frame memory 3, and sequentially outputs the generated tone compression characteristics. Then, during this period from time t4 to time t5, the tone compression unit 6 applies tone compression processing to the composed image H2+L2 output from the composing unit 4 using the tone compression characteristics g(L2).

During a period from time t3 to time t5, the motion region estimation unit 107 determines a motion region using the low-exposure image L2 and high-exposure image H2 to be composed, and outputs a determination result A(H2−L2). The system control unit 8 updates the control signal S3 to be referred to in composing processing from time t5 to "1" based on the determination result A(H2−L2). This is because since it is determined as a result of analysis of an image to be currently captured that a still region becomes dominant, preferred image quality can be obtained by capturing a high-exposure image earlier in the next composing processing to optimize tone compression characteristics in the still region.

During a period from time t5 to time t7, since the control signal S3 is "1", images of two frames to be composed are output from the image sensing device 2 in an order of the high-exposure image H3 as the first frame and low-exposure image L3 as the second frame. Then, the system control unit 8 writes the high-exposure image H3 in the frame memory 3 during a 1V period from time t5 to time t6. Parallel to this, the tone compression characteristics generation unit 5 stores a reduced image of the high-exposure image H3 in the memory 54 until time t6.

During a period from time t6 to time t7, the composing unit 4 composes the high-exposure image H3 written in the frame memory 3 and the low-exposure image L3 output from the image sensing device 2, and outputs a composed image H3+L3. Parallel to this processing, the tone compression characteristics generation unit 5 generates tone compression characteristics g(H3) based on the reduced image of the image H3 held in the memory 54 and the image H3 read out from the frame memory 3, and sequentially outputs the generated tone compression characteristics. Then, during this period from time t6 to time t7, the tone compression unit 6 applies tone compression processing to the composed image H3+L3 output from the composing unit 4 using the tone compression characteristics g(H3).

During a period from time t5 to time t7, the motion region estimation unit 107 determines a motion region using the high-exposure image H3 and low-exposure image L3 to be composed, and outputs a determination result A(L3−H3). The system control unit 8 updates the control signal S3 to be referred to in composing processing from time t7 to "1" based on the determination result A(L3−H3). This is because since it is determined as a result of analysis of an image to be currently captured that a still region is dominant, preferred image quality can be obtained by capturing a high-exposure image earlier also in the next composing processing to optimize tone compression characteristics in the still region.

By executing the aforementioned series of imaging control operations, tone compression is executed using tone compression characteristics suited to a composed image, a dynamic range of which is expanded by composing a plurality of images having different exposure amounts, thus outputting a video signal.

An image used to generate tone compression characteristics is determined based on a determination result as to whether a motion or still part is dominant in an image to be captured, thus allowing tone compression processing suited to the image to be captured.

Also, the image capture apparatus 100 of this embodiment can generate tone compression characteristics for a composed image using an image buffered in the frame memory 3 for the purpose of composing processing, thus avoiding an increase in system load due to memory accesses.

According to the aforementioned second embodiment, upon execution of composing processing for expanding a dynamic range, compression using proper tone compression characteristics according to a change in image in a moving image can be implemented while suppressing an increase load on the system.

Third Embodiment

The first and second embodiments have explained the arrangement in which an application order of exposure amounts of two frames continuously output from the image sensing device 2 is swapped upon switching the exposure amounts of the first and second frames of two frames to be composed based on the analysis result of the image analyzing unit 7. For example, the arrangement in which exposure amounts corresponding to the first and second frames are switched by switching an order like from [low-exposure image L→high-exposure image H] to [high-exposure image H→low-exposure image L] is adopted. However, the present invention is not limited to such specific arrangement which adjusts the order of high- and low-exposure images as two frames to be composed by swapping an output order from the image sensing device 2. For example, an arrangement in which a frame to be held by the frame memory 3 is shifted by one frame to switch exposure amounts of the first and second frames may be adopted. The third embodiment will explain such arrangement.

The third embodiment will also explain an image capture apparatus which outputs an image for one frame, a dynamic range of which is expanded by composing images for two frames having different exposure amounts. Note that the arrangement of the image capture apparatus 100 of the third embodiment is the same as that of the first embodiment, but the image capture apparatus of the second embodiment (FIG. 6) can also be used. As in the first embodiment, since the composing unit 4 and tone compression characteristics generation unit 5 share the frame memory 3, tone compression characteristics for a composed image are generated using an image to be buffered in the frame memory 3 of those of two frames to be composed.

However, the third embodiment can obviate a mechanism for selecting based on the result of the image analyzing unit 7 whether a low- or high-exposure image is to be captured earlier unlike in the first embodiment. That is, driving of the image sensing device 2 of the third embodiment is controlled to always capture a low- or high-exposure image earlier. The third embodiment controls an image write timing in the frame memory 3 based on the result of the image analyzing unit 7 so that an image which allows to generate preferred tone compression characteristics of images of two frames to be composed is buffered in the frame memory 3.

As a result of analysis of the image analyzing unit 7, when a dark part is dominant in an image to be captured, the system control unit 8 controls to buffer a high-exposure image in the frame memory 3, and when a bright part is dominant, it controls to buffer a low-exposure image in the frame memory 3. In this case, when a dominant brightness region changes from a dark part to a bright part or vice versa, two frames of high- and low-exposure images output from the image sensing device 2 are continuously buffered in the frame memory 3.

For this reason, the image analyzing processing of the image analyzing unit 7 has to be ended during a 1V period in which an output image of the image sensing device 2 is buffered in the frame memory 3, and whether or not an image is required to be buffered in the frame memory 3 has to be judged in the next 1V period. For this purpose, in the third embodiment, signal read accesses from the image sensing device 2 are made twice by decimating an image by two lines each.

For example, when the image sensing device 2 has a pixel layout shown in FIG. 17, signals of lines L0, L1, L4, L5, . . . of the image sensing device 2 are read out in the former half of a 1V period, and signals of lines L2, L3, L6, L7, . . . of the image sensing device 2 are read out during the latter half of the 1V period. The image analyzing unit 7 inputs an image which is read out from the image sensing device 2 during the former half of the 1V period and is decimated to ½ in the vertical direction, and executes analyzing processing in the latter half of the 1V period. Therefore, while an image for one frame is written in the frame memory 3, whether or not an image is to be buffered in the frame memory 3 during the next 1V period can be determined.

Control of the image capture apparatus of the third embodiment will be described below with reference to FIG. 13. The image sensing device 2 always outputs images to be composed in an order of a low-exposure image and high-exposure image. A control signal S1 is a binary control signal used to control an image write access to the frame memory 3 and ON/OFF of processing in the tone compression characteristics generation unit 5, and is updated for each 1V period. When the control signal S1 is "1", an output image of the image sensing device 2 is written in the frame memory 3 by spending a 1V period. At the same time, an output image of the image sensing device 2 is input to the tone compression characteristics generation unit 5, and a reduced image of that output image is generated and is held in the memory 54 by spending a 1V period. When the control signal S1 is "0", an image write access to the frame memory 3 is stopped, and the reduced image generation processing of the tone compression characteristics generation unit 5 is disabled.

In this case, when the control signal S1 is "0" during a certain 1V period, it always changes to "1" during the next 1V period. Also, when the control signal S1 is "1" during a certain 1V period, whether the control signal S1 assumes a value "0" or "1" during the next 1V period is determined depending on an analysis result for an image input to the image analyzing unit 7.

When the control signal S1 is "1" during a certain 1V period, an input image to the image analyzing unit 7 is a low-exposure image, and it is determined based on the analysis result of the image analyzing unit 7 that a bright part is dominant, the system control unit 8 sets the control signal S1 to be "0" during the next 1V period. This is because when a bright part is dominant in an image to be captured, since tone compression characteristics need only be generated using the low-exposure image buffered in the frame memory 3, a high-exposure image need not be buffered during the next 1V period.

On the other hand, when the control signal S1 is "1" during a certain 1V period, an input image to the image analyzing unit 7 is a low-exposure image, and it is determined based on the analysis result of the image analyzing unit 7 that a dark part is dominant, the system control unit 8 sets the control signal S1 to be "1" during the next 1V period. This is because when a dark part is dominant in an image to be captured, a high-exposure image has to be buffered in the frame memory 3 during the next 1V period to generate dark part-emphasized tone compression characteristics.

Also, when the control signal S1 is "1" during a certain 1V period, an input image to the image analyzing unit 7 is a high-exposure image, and it is determined based on the analysis result of the image analyzing unit 7 that a bright part is dominant, the system control unit 8 sets the control signal S1 to be "0" during the next 1V period. This is because when a dark part is dominant in an image to be captured, since tone compression characteristics need only be generated using the high-exposure image buffered in the frame memory 3, a low-exposure image need not be buffered during the next 1V period.

Furthermore, when the control signal S1 is "1" during a certain 1V period, an input image to the image analyzing unit 7 is a high-exposure image, and it is determined based on the analysis result of the image analyzing unit 7 that a bright part is dominant, the system control unit 8 sets the control signal S1 to be "1" during the next 1V period. This is because when a bright part is dominant in an image to be captured, a low-exposure image has to be buffered in the frame memory 3 during the next 1V period to generate bright part-emphasized tone compression characteristics.

A control signal S2 is a binary signal used to control an image read access from the frame memory 3, ON/OFF of processing in the composing unit 4, and ON/OFF of processing in the tone compression unit 6. When the control signal S2 is "0", an image read access from the frame memory 3 is stopped, and the processes in the composing unit 4 and tone compression unit 6 are disabled. When the control signal S2 is "1", an image written in the frame memory 3 is read out, and the composing unit 4 executes composing processing for expanding a dynamic range using an image output from the image sensing device 2 and that read out from the frame memory 3. The tone compression characteristics generation unit 5 generates and outputs tone compression characteristics using the image read out from the frame memory 3 and a reduced image read out from the memory 54. Then, the tone compression unit 6 applies tone compression processing to the composed image output from the composing unit 4 using the tone compression characteristics from the tone compression characteristics generation unit 5.

Also, the read processing from the frame memory 3 and the processes in the composing unit 4 and tone compression unit 6, which are controlled based on the control signal S2, are executed 1V after completion of the image write processing in the frame memory 3 and the processing in the tone compression characteristics generation unit 5, which are controlled based on the control signal S1. Therefore, the control signal S2 is generated by delaying the waveform of the control signal S1 by 1V.

Figure 13:
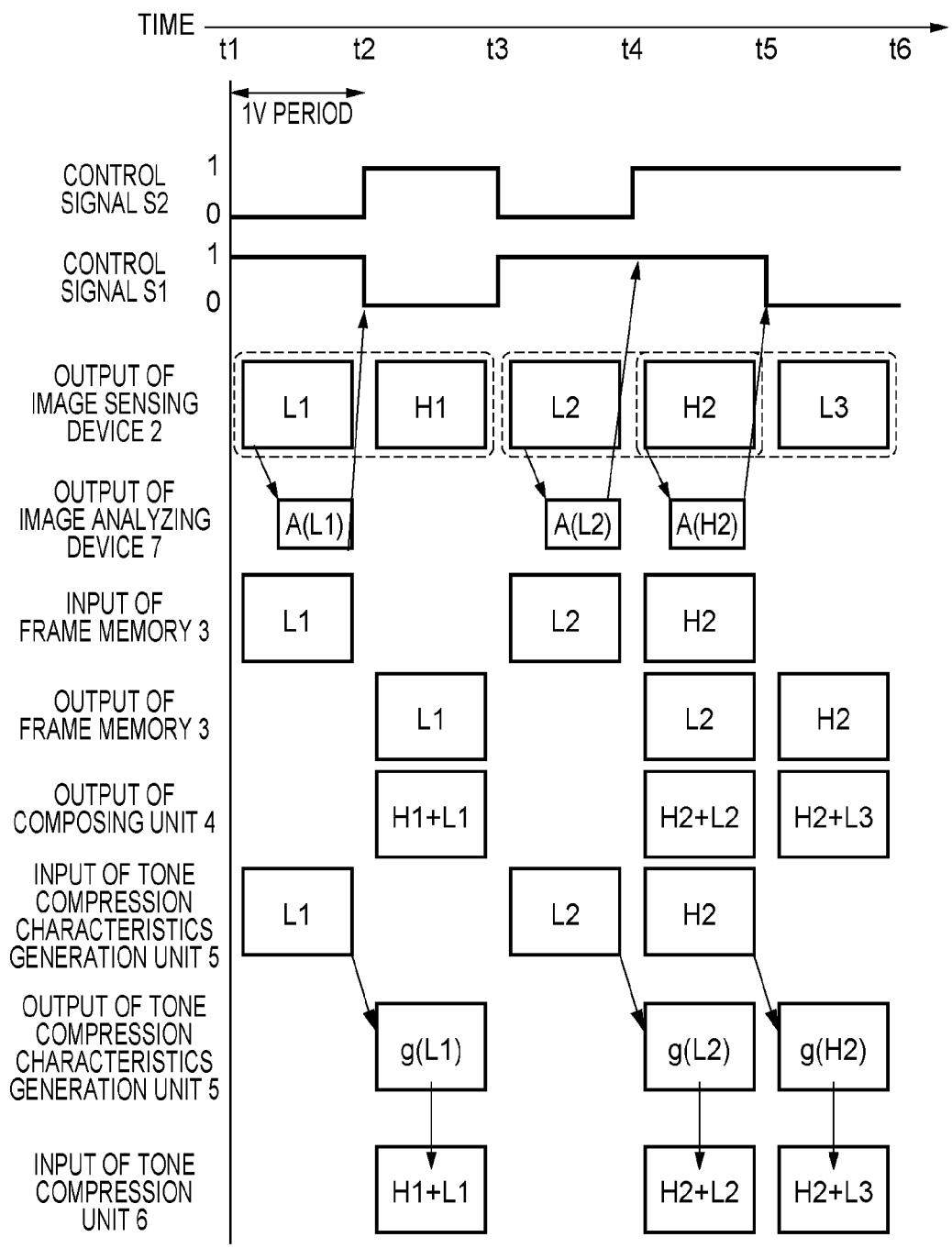
FIG. 13 is a timing chart showing image composing processing according to the third embodiment.

In FIG. 13, the control signal S1 is "1" at time t1. Hence, during a 1V period from time t1 to time t2, a low-exposure image L1 is written in the frame memory 3. Parallel to this, a reduced image of the low-exposure image L1 is generated and is held in the memory 54 until time t2. During a period from time t2 to time t3, the composing unit 4 composes the low-exposure image L1 held in the frame memory 3 and a high-exposure image H1 output from the image sensing device 2 and outputs an image H1+L1. Parallel to this, the tone compression characteristics generation unit 5 generates tone compression characteristics g(L1) from the low-exposure image L1 held in the frame memory 3 and the reduced image held in the memory 54. Then, the tone compression unit 6 applies tone compression processing to the composed image H1+L1 using the tone compression characteristics g(L1).

The image analyzing unit 7 receives a low-exposure image L1, which is decimated to ½ in the vertical direction, during the former half of the 1V period from time t1 to time t2, and generates an image analysis result A(L1) during the latter half of the 1V period from time t1 to time t2. Then, based on the result A(L1), the system control unit 8 updates the control signal S1 to "0" at time t2. This is because since it is determined as a result of analysis of an image to be currently captured that a bright part is dominant, it is preferable to optimize the tone compression characteristics using a low-exposure image also in the next composing processing, and it is judged that a high-exposure image need not be buffered during a period from time t2 to time t3.

Since the control signal S1 is "0" during a 1V period from time t2 to time t3, it is updated to "1" during a 1V period from time t3 to time t4. During the period from time t3 to time t4, since the control signal S1 is "1", a low-exposure image L2 output from the image sensing device 2 is written in the frame memory 3. Parallel to this, a reduced image of the low-exposure image L2 is generated and is held in the memory 54 until time t4.

The image analyzing unit 7 receives a low-exposure image L2, which is decimated to ½ in the vertical direction, during the former half of the 1V period from time t3 to time t4, and generates an image analysis result A(L2) during the latter half of the 1V period from time t3 to time t4. Then, based on the analysis result A(L2), the system control unit 8 updates the control signal S1 to "1" at time t4. This is because since it is determined as a result of analysis of an image to be currently captured that a dark part becomes dominant, it is preferable to optimize the tone compression characteristics using a high-exposure image in the next composing processing, and it is judged that a high-exposure image is required to be buffered during a period from time t4 to time t5.

During a period from time t4 to time t5, the composing unit 4 composes the low-exposure image L2 written in the frame memory 3 and a high-exposure image H2 output from the image sensing device 2 and outputs an image H2+L2. Parallel to this, the tone compression characteristics generation unit 5 generates tone compression characteristics g(L2) from the low-exposure image L2 held in the frame memory 3 and the reduced image held in the memory 54. Then, the tone compression unit 6 applies tone compression processing to the composed image H2+L2 using the tone compression characteristics g(L2).

Since the control signal S1 is "1" during the period from time t4 to time t5, when the low-exposure image L2 is read out from the frame memory 3 for the aforementioned composing processing, it is sequentially overwritten by the high-exposure image H2. Parallel to this, the reduced image of the low-exposure image L2 is generated and is held in the memory 54 until time t5. Note that when the reduced image is written in the memory 54, after the reduced image generated during the period from time t3 to time t4 is read out from the memory 54, it is sequentially overwritten.

Furthermore, the image analyzing unit 7 receives a high-exposure image H2, which is decimated to ½ in the vertical direction, during the former half of the 1V period from time t4 to time t5, and generates an image analysis result A(H2) during the latter half of the 1V period from time t4 to time t5. Then, based on the analysis result A(H2), the system control unit 8 updates the control signal S1 to "0" at time t5. This is because since it is determined as a result of analysis of an image to be currently captured that a dark part becomes dominant, it is preferable to optimize the tone compression characteristics using a high-exposure image also in the next composing processing, and it is judged that a low-exposure image need not be buffered during a period from time t5 to time t6.

During a period from time t5 to time t6, the composing unit 4 composes the high-exposure image H2 written in the frame memory 3 and a low-exposure image L3 output from the image sensing device 2 and outputs an image H2+L3. Parallel to this, the tone compression characteristics generation unit 5 generates tone compression characteristics g(H2) from the high-exposure image H2 held in the frame memory 3 and the reduced image held in the memory 54. Then, the tone compression unit 6 applies tone compression processing to the composed image H2+L3 using the tone compression characteristics g(H2). Note that since the control signal S1 is "0" during the 1V period from time t5 to time t6, it is updated to "1" during a 1V period from time t6 to time t7.

By executing the aforementioned series of imaging control operations, in the third embodiment as well, a plurality of images having different exposure amounts are composed, and tone compression is executed using tone compression characteristics suited to the composed image, thus outputting a video signal.

As described above, the image capture apparatus of the third embodiment can generate tone compression characteristics for a composed image using the same image as that to be buffered in the frame memory 3 for composing processing, thus avoiding an increase in system load due to memory accesses.

Since an image to be used to generate tone compression characteristics is determined by analyzing features of an image to be captured, tone compression processing suited to the image to be captured can be executed. Also, the image sensing device 2 need not have an arrangement which switches an acquisition order of low- and high-exposure images.

Note that in the third embodiment, whether or not exposure amounts of the first and second frames are to be switched is determined until an input operation of an image of the first frame is complete, and if the exposure amounts are required to be switched, they are switched in the next frame (for example, t3 to t4). With this arrangement, an idle frame which is not used in composing processing can be prevented from being generated. However, from a viewpoint of swapping exposure amounts of the first and second frames according to the analysis result of the image analyzing unit 7, the present invention is not limited to such specific arrangement. For example, the analysis processing of the image analyzing unit 7 may be executed by spending one frame period, and an order of exposure amounts of two frames may be switched two frames after the analysis processing. For example, in FIG. 13, an image may be analyzed during a period from time t3 to time t4, and if it is determined that an image of a high exposure amount is to be held in the frame memory 3, the control signal S1 may be updated to "1" at a timing of time t6.

Fourth Embodiment

An image capture apparatus of the fourth embodiment will be described below. The fourth embodiment will explain an image capture apparatus which composes images of n frames having different exposure amounts, and outputs an image for one frame, a dynamic range of which is expanded. In this case, n is a natural number equal to or larger than 3, and this embodiment will exemplify a case of n=3.

Figure 14:
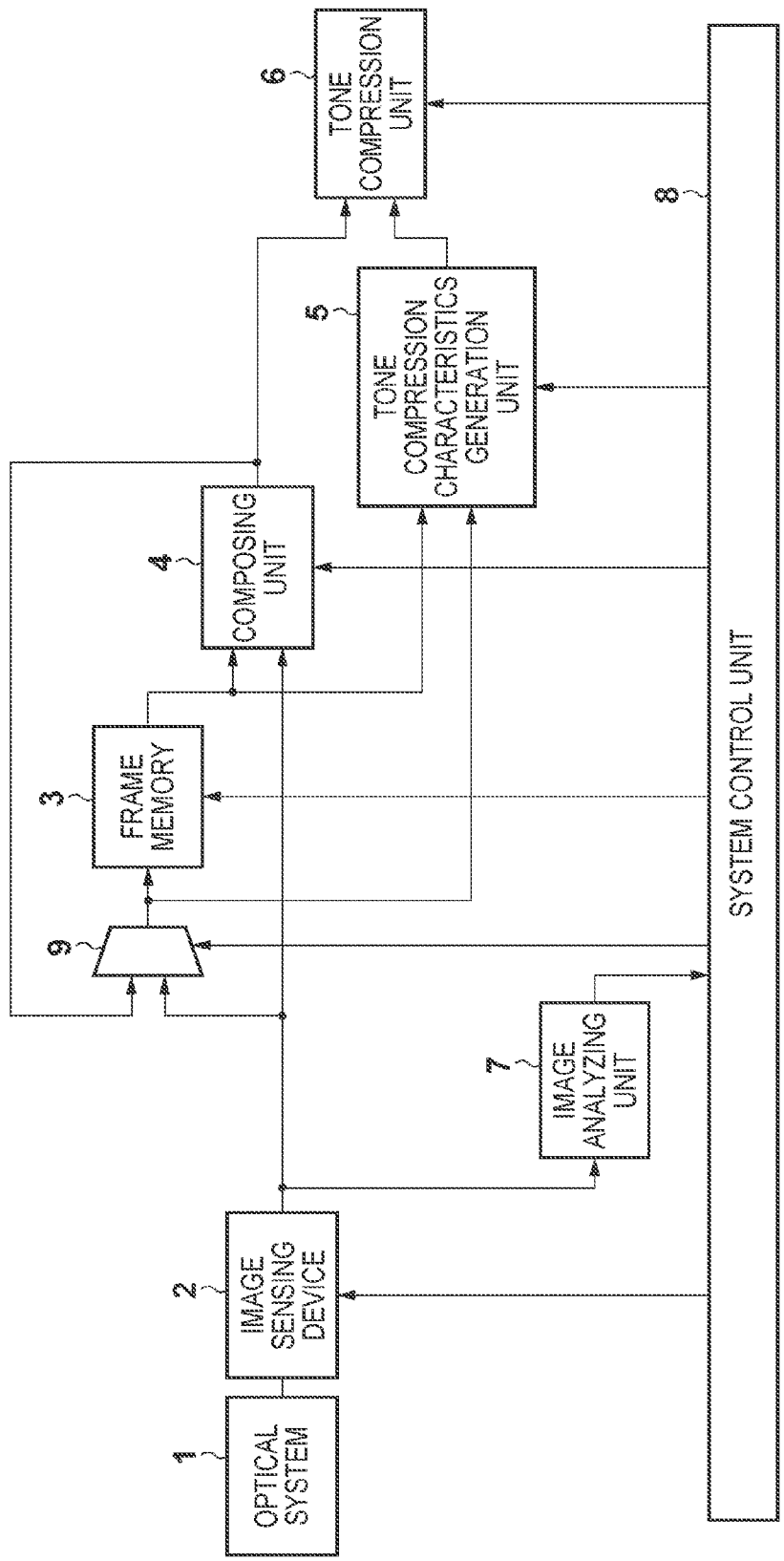
FIG. 14 is a block diagram showing the arrangement of an image capture apparatus according to the fourth embodiment.

FIG. 14 shows the arrangement of an image capture apparatus 101 of the fourth embodiment. In the image capture apparatus 101, a selection unit 9 is added to the arrangement of the image capture apparatus 100 of the first embodiment. Also, an output from the selection unit 9 is input to the frame memory 3 and tone compression characteristics generation unit 5 unlike in the first embodiment.

An overview of the operation of the image capture apparatus 101 of the fourth embodiment will be described below. When an imaging operation is started, the system control unit 8 controls the optical system 1 and image sensing device 2 so that an exposure amount of an image output from the image sensing device 2 changes in 3V periods. An image output from the image sensing device 2 via the optical system 1 is input to the selection unit 9, composing unit 4, and image analyzing unit 7.

The selection unit 9 receives an output image from the composing unit 4 together with the output image of the image sensing device 2, and selects one of output image from the composing unit 4 and that from the image sensing device 2 based on a control signal from the system control unit 8. The output image selected by the selection unit 9 is input to the frame memory 3 and tone compression characteristics generation unit 5. The frame memory 3 buffers the output image from the selection unit 9 for one frame. The selection unit 9 controls the frame memory 3 to hold a signal from the image sensing device 2 at a timing of the first frame of n frames to be composed, and controls the frame memory 3 to hold a composed image output from the composing unit 4 until a timing of an (n−1)-th frame from the second frame. The composing unit 4 composes an image read out from the frame memory 3 and an output image from the image sensing device 2. As a result, the frame memory 3 holds an image of the first frame or a composed image up to a frame immediately before the current frame of the n frames to be composed, which are continuously output from the image sensing device 2.

The tone compression characteristics generation unit 5 generates tone compression characteristics for an output image of the composing unit 4 using an image read out from the frame memory 3 and an output image from the selection unit 9. The tone compression unit 6 applies tone compression to the output image of the composing unit 4 using the tone compression characteristics output from the tone compression characteristics generation unit 5, so as to attain tone reproduction preferable for an image to be captured, and to fall within a dynamic range of an output video format. That is, when a composed image up to the (n−1)-th frame is held in the frame memory 3, the tone compression characteristics generation unit 5 generates tone compression characteristics based on the image held in the frame memory 3 and a resolution-reduced image of the held image. Then, the tone compression unit 6 compresses tones of a composed image up to the n-th frame, which is output from the composing unit 4, using the generated tone compression characteristics.

In the fourth embodiment as well, the frame memory 3 buffers an image for one frame as in the first embodiment. Therefore, when images of three or more frames are to be composed, operations for sequentially composing images for two frames are repeated. When three frames are to be composed, after the first and second frames are composed, the composed result of the first and second frames and an input image of the third frame are composed. For this reason, the frame memory 3 of this embodiment is required to have a capacity that can hold an image for one frame having an expanded dynamic range after composing, that is, an image for one frame in which the number of bits per pixel is increased. When images for n frames are to be composed, after composing operations of two frames are repeated n−1 times, tone compression processing is executed.

For this reason, in the fourth embodiment, the selection unit 9 is arranged before the frame memory 3, as shown in FIG. 14. Then, upon composing images for n frames, an output image of the image sensing device 2 is written in the frame memory 3 at a first composing timing, and an output image of the composing unit 4 is written in the frame memory 3 until an (n−1)-th composing timing from the second composing timing.

The internal arrangement of the tone compression characteristics generation unit 5 is the same as that in the first embodiment, except for some input signals. That is, an output image of the frame memory 3 is input to the input terminal 58 in FIG. 2, and an output image of the selection unit 9 is input to the input terminal 59.

As described above, according to this embodiment, when images for n frames are to be composed, the frame memory 3 buffers an intermediate composed image, and composing processing of two frames is repeated. After completion of the composing processing of all the n frames, the tone compression processing is executed. For this reason, tone compression characteristics are generated using an image generated by the composing processing ((n−2)-th composing processing) until the (n−1)-th frame. To the input terminal 59 (FIG. 2), an image after the (n−2)-th composing processing, which is output from the selection unit 9, is input to execute reduction processing, and a reduced image is stored in the memory 54. Also, the frame memory 3 stores an image after the (n−2)-th composing processing.

Processes from the input terminal 59 to the image enlargement unit 55 requires a 1V period as in the first embodiment. A low-resolution image, and a high-exposure image, which is input from the frame memory 3 via the input terminal 58 and is obtained via the brightness generation unit 51, are input to the local brightness estimation unit 56 while synchronizing their timings. The processes in the local brightness estimation unit 56 and tone compression characteristics determination unit 57 are the same as those in the first embodiment.

In the fourth embodiment as well, the composing unit 4 and tone compression characteristics generation unit 5 share the frame memory 3 which buffers an image for one frame. Therefore, compositions of composed images up to the (n−1)-th frame used in the tone compression characteristics generation unit 5 are determined based on the analysis result of the image analyzing unit 7 so as to generate tone compression characteristics suited to an image to be captured.

For example, when a bright part is dominant, as shown in FIG. 4A, driving of the image sensing device 2 is controlled to capture images in turn from an image having a low exposure amount upon capturing next images to be composed. Then, a composed image (that up to the (n−1)-th frame) until the (n−2)-th composing processing, which image is to be referred to by the tone compression characteristics generation unit 5, is generated based on a low-exposure image, thus generating tone compression characteristics suited to a bright part.

On the other hand, when a dark part is dominant, as shown in FIG. 4B, driving of the image sensing device 2 is controlled to capture images in turn from an image having a high exposure amount upon capturing next images to be composed. Then, a composed image (that up to the (n−1)-th frame) until the (n−2)-th composing processing, which image is to be referred to by the tone compression characteristics generation unit 5, is generated based on a high-exposure image, thus generating tone compression characteristics suited to a dark part.

As described above, an order of exposure amounts of n frames to be composed can be switched so that an image of the n-th frame of the n frames has a maximum or minimum exposure amount. For example, when three frames are to be composed as in this embodiment, whether an image of at least the third frame has a maximum or minimum exposure amount can be determined based on the analysis result of the image analyzing unit 7.

Note that in this embodiment, the image analyzing unit 7 refers to an output image from the image sensing device 2 before composing. However, the present invention is not limited to this. For example, image analysis may be executed with reference to an intermediate composed image output from the composing unit 4. The analysis method of the image analyzing unit 7 is the same as that in the first embodiment.

An example of the imaging control of the fourth embodiment will be described below with reference to the timing chart shown in FIG. 15. The image sensing device 2 outputs images having different exposure amounts for respective 1V periods, and each combination of images before composing, which are used to generate one composed image, is bounded by a broken line in FIG. 15. That is, during a period from time t1 to time t4, output images L1, M1, and H1 of the image sensing device 2 are composed. During a period from time t4 to time t7, output images H2, M2, and L2 of the image sensing device 2 are composed. Note that in a combination of images to be composed, an image described with L has a smallest exposure amount, that described with H has a largest exposure amount, and that described with M has an intermediate exposure amount between L and H.

A control signal S1 is a binary control signal used to control an image write access to the frame memory 3. When the control signal S1 is "0", the image write access to the frame memory 3 is stopped. When the control signal S1 is "1", an output image from the selection unit 9 is written in the frame memory 3 by spending a 1V period.

An identification signal I indicates an image of a frame used in composing processing of those of n frames, and periodically changes like 0, 1, 2, 0, 1, 2, . . . in case of three frames to be composed. The identification signal I is also controlled by the system control unit 8. When the identification signal I is "0", the selection unit 9 selects an image from the image sensing device 2, and the image output from the image sensing device 2 is written in the frame memory 3. When the identification signal I is "1", the selection unit 9 selects an output image (intermediate composed image) from the composing unit 4, and the output image of the composing unit 4 is written in the frame memory 3. When the identification signal I is "2", the control signal S1 is set to be "0" to stop the image write access to the frame memory.

The identification signal I is also referred to by the tone compression characteristics generation unit 5. When the identification signal I is "1" (when n frames are to be combined, I="n−2"), the tone compression characteristics generation unit 5 fetches a combined image (intermediate combined image up to the (n−1)-th frame) from the selection unit 9, generates a reduced image, and stores it in the memory 54. Therefore, when tone compression is applied to a composed result of images of n frames having different exposure amounts, tone compression characteristics are generated with reference to a composed result of images up to the (n−1)-th frame. When three frames are to be composed as in this embodiment, tone compression characteristics are generated from the composed result up to the second image.

A control signal S2 is a binary signal used to control an image read access from the frame memory 3, and ON/OFF of processes in the composing unit 4 and tone compression unit 6. When the control signal S2 is "1", the composing unit 4 reads out an image written in the frame memory 3, and executes composing processing using an image output from the image sensing device 2 and the image read out from the frame memory 3. Also, when the control signal S2 is 1", the tone compression unit 6 refers to the aforementioned identification signal I. When the identification signal I is "n−1" upon composing n frames (I="2" upon composing three frames), the tone compression unit 6 applies tone compression processing to the output from the composing unit 4.

A control signal S3 is used to determine a capturing order of images for three frames to be composed, which have different exposure amounts, and is determined based on the result of the image analyzing unit 7. The control signal S3 is set to be "0" when it is determined that a bright part is dominant in an image to be captured, and is set to be "1" when it is determined that a dark part is dominant in an image to be captured. When the control signal S3 is "0", the image sensing device 2 is controlled to capture images for two frames having smaller exposure amounts earlier of those of three frames to be composed. On the other hand, when the control signal S3 is "1", the image sensing device 2 is controlled to capture images for two frames having larger exposure amounts earlier of those of three frames to be composed.

Figure 15:
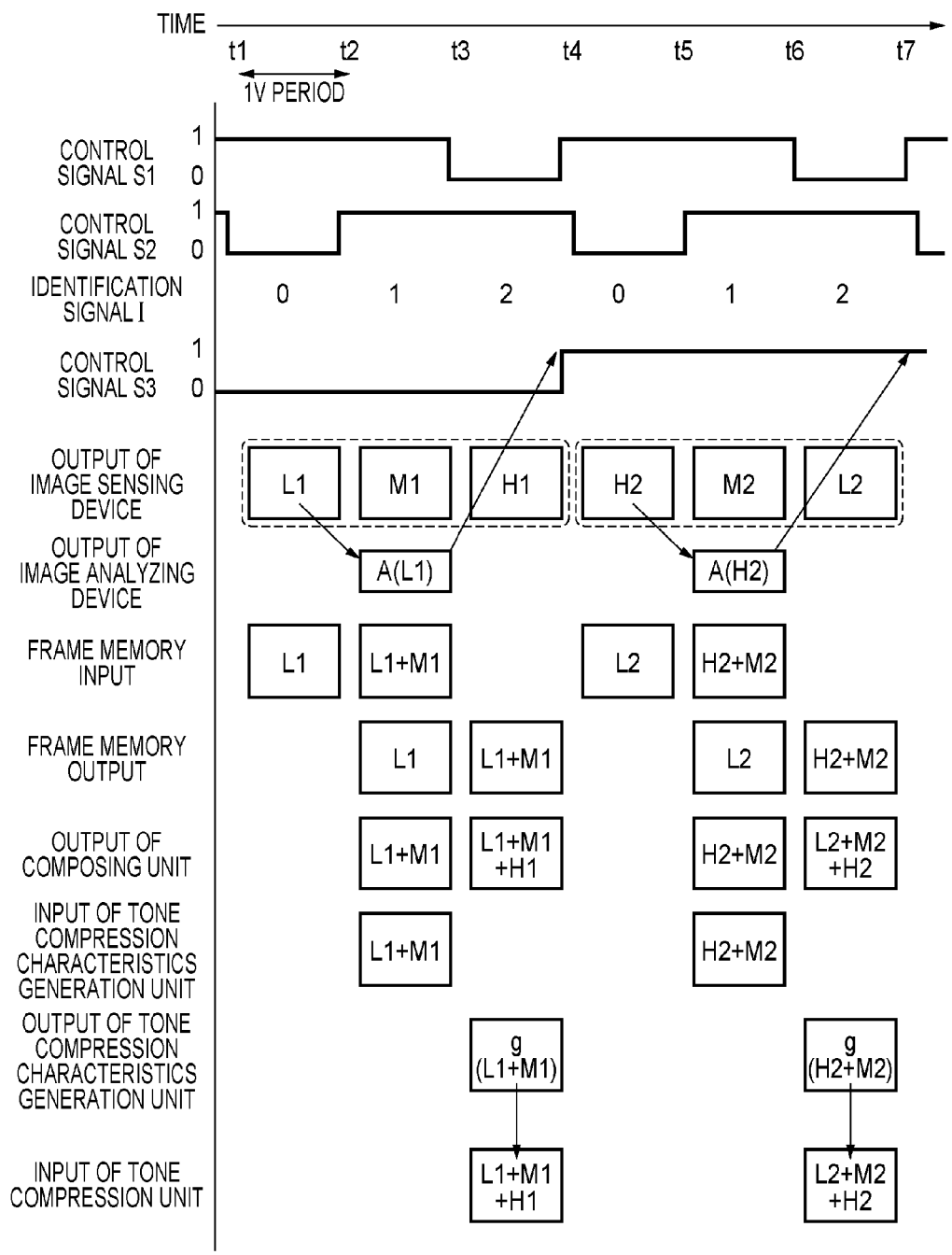
FIG. 15 is a timing chart showing image composing processing according to the fourth embodiment.

In FIG. 15, when the identification signal I is "0", processing of the image analyzing unit 7 is executed using an image output from the image sensing device 2. Alternatively, when the identification signal I is "1", an image output from the image sensing device 2 or an intermediate composed image may be used.

In FIG. 15, during a period from time t1 to time t4, since the control signal S3 is "0", the image sensing device 2 outputs images L1, M1, and H1 for three frames to be composed in turn from that having the smallest exposure amount.

During a period from time t1 to time t2, the image L1 is written in the frame memory 3. During a period from time t2 to time t3, the composing unit 4 composes the image L1 read out from the frame memory 3 and the image M1 output from the image sensing device 2. A composed image L1+M1 is overwritten on the frame memory 3, and is input to the tone compression characteristics generation unit 5. The tone compression characteristics generation unit 5 generates a low-resolution image, and stores that image in the memory 54 by spending a 1V period.

During a period from time t3 to time t4, the composing unit 4 reads out the intermediate composed image L1+M1 from the frame memory 3, and composes it with the image H1 output from the image sensing device 2, thus outputting a composed image L1+M1+H1. The tone compression characteristics generation unit 5 generates tone compression characteristics g(L1+M1) using the intermediate composed image L1+M1 read out from the frame memory 3, and its reduced image (held in the memory 54 1V before), and outputs the generated tone compression characteristics. The tone compression unit 6 applies tone compression to the composed image L1+M1+H1 output from the composing unit 4 using the tone compression characteristics g(L1+M1) from the tone compression characteristics generation unit 5.

During a period from time t1 to t4, the image analyzing unit 7 executes analysis using the image L1 output from the image sensing device 2 first of those of a plurality of frames to be composed, and outputs an analysis result A(L1). Then, based on the analysis result A(L1), the system control unit 8 updates the control signal S3 to be referred to in composing processing from time t4 to "1". This is because it can be judged as a result of analysis of an image to be currently captured that a dark part becomes dominant, and it is preferable to capture a high-exposure image earlier in the composing processing from time t4 and to optimize tone compression characteristics for the dark part.

During a period from time t4 to time t7, since the control signal S3 is "1", images for three frames to be composed are output from the image sensing device 2 in turn from an image having a larger exposure amount, that is, in the order of images H2, M2, and L2.

During a period from time t4 to time t5, the image H2 is written in the frame memory 3. During a period from time t5 to time t6, the composing unit 4 composes the image H2 read out from the frame memory 3 and the image M2 output from the image sensing device 2. A composed image H2+M2 is overwritten on the frame memory 3 and is input to the tone compression characteristics generation unit 5. The tone compression characteristics generation unit 5 generates a low-resolution image, and stores it in the memory 54 by spending a 1V period.

During a period from time t6 to time t7, the composing unit 4 composes the image H2+M2 read out from the frame memory 3 and the image L2 output from the image sensing device 2, and outputs a composed image H2+M2+L2. The tone compression characteristics generation unit 5 generates tone compression characteristics g(H2+M2) using the intermediate composed image H2+M2 read out from the frame memory 3 and its reduced image (held in the memory 54 1V before), and outputs the generated tone compression characteristics. The tone compression unit 6 applies tone compression to the composed image H2+M2+L2 output from the composing unit 4 using the tone compression characteristics g(H2+M2) from the tone compression characteristics generation unit 5.

During a period from time t4 to time t7, the image analyzing unit 7 executes analysis processing using the image H2 which is output from the image sensing device 2 first of those of a plurality of frames to be composed, and outputs an analysis result A(H2). Based on the analysis result A(H2), the system control unit 8 updates the control signal S3 to be referred to in composing processing from time t7. By executing the aforementioned series of imaging control operations, a plurality of images having different exposure amounts are composed, and tone compression is applied using tone compression characteristics suited to a composed image, thus outputting a video signal.

As described above, even when images of n frames are to be composed, tone compression characteristics for a composed image can be generated using the same image as that to be buffered in the frame memory 3 for the purpose of composing processing. For this reason, an increase in system load due to memory accesses can be avoided. Since an image used to generate tone compression characteristics is determined by analyzing features of an image to be captured, tone compression processing suited to the image to be captured can be executed.

In the example of the above description, the image capture apparatus described in the first embodiment is expanded to the apparatus which composes n images. Also, as is apparent from the above description, the image capture apparatus according to the second embodiment can be expanded to the apparatus which composes n images. A method of expanding image composing processing of the image capture apparatus described in the second embodiment to n images will be briefly explained below. In this case, the image sensing device 2 continuously outputs images having n different exposure amounts, and the composing unit 4 composes images of n frames to be composed, thereby generating a composed image, a dynamic range of which is expanded. In this case, the frame memory 3 holds the first frame of the n frames. After that, during an output period of the second to (n−1)-th frames from the image sensing device 2, the contents of the frame memory 3 are sequentially overwritten by composed images output from the composing unit 4. The composing unit 4 composes a composed image up to the immediately preceding frame, which is read out from the frame memory 3, and an image of the current frame, which is currently output from the image sensing device 2. Note that the motion pixel determination unit 41 determines a pixel of a motion or still part based on a difference between pixel values of corresponding pixels of the composed image up to the immediately preceding frame and the image of the current frame.

The tone compression characteristics generation unit 5 generates tone compression characteristics using an image generated by reducing a resolution of a composed image up to the (n−1)-th frame of the n frames, and the composed image up to the (n−1)-th frame. The motion region estimation unit 107 estimates a part where a motion has occurred from the composed image up to the (n−1)-th frame and an image of the n-th frame, and the system control unit 8 swaps an application order of exposure amounts in the n frames to be composed based on that estimation result. For example, when a motion region is dominant, the system control unit 8 controls to output an image of a lowest exposure amount of n exposure amounts as the n-th frame. On the other hand, when a still region is dominant, the system control unit 8 controls to output an image of a highest exposure amount of n exposure amounts as the n-th frame. With this arrangement, when a motion region is dominant, tone compression characteristics are generated based on a composed image obtained by composing images of lower exposure amounts of the first to (n−1)-th frames, and more appropriate tone compression is applied to an image to be captured. Likewise, when a still region is dominant, tone compression characteristics are generated based on a composed image obtained by composing images of higher exposure amounts of the first to (n−1)-th frames, and more appropriate tone compression is applied to an image to be captured.

As described above, according to the respective embodiments, when an image with a broad dynamic range is generated by composing a plurality of captured images having different exposure amounts, an increase in system load can be suppressed.

In the fourth embodiment, whether an n-th image is an image of a minimum or maximum exposure amount is determined using an intermediate composed image obtained by composing the first to (n−1)-th images. However, the present invention is not limited to this. For example, the first image may be used, or an intermediate composed image in an arbitrary stage, which is held in the frame memory 3, may be used.

Note that the above embodiments have been explained under the assumption that the image capture apparatus 100 captures a moving image. However, the present invention is applicable to a case in which the image capture apparatus 100 executes continuous shooting operations of still images.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-209784, filed Sep. 26, 2011, and No. 2011-209785, filed Sep. 26, 2011, which are hereby incorporated by reference herein in their entirety.

What is claimed is:

1. An image capture apparatus, which generates an image, a dynamic range of which is expanded, by composing two images having different exposure amounts, comprising:
   an imaging unit configured to output a first image and a second image which follows the first image by imaging operations that sequentially apply two different exposure amounts;
   a composing unit configured to generate a composed image, a dynamic range of which is expanded, by composing the first image and the second image;
   a generation unit configured to generate tone compression characteristics based on the first image and an image generated by reducing a resolution of the first image;
   a tone compression unit configured to compress tones of the composed image using the tone compression characteristics generated by said generation unit; and
   a holding unit configured to hold the first image in a memory,
   wherein said generation unit generates the resolution-reduced image parallel to a holding operation of the first image in the memory.

2. The apparatus according to claim 1, further comprising:
   an analyzing unit configured to analyze the first image to determine which of the two exposure amounts is appropriate as an exposure amount of an image used to generate the tone compression characteristics; and
   a control unit configured to control correspondence between the first image and the second image, and the two exposure amounts, so as to control said generation unit to use an image captured using an appropriate exposure amount determined by said analyzing unit.

3. The apparatus according to claim 2, wherein said imaging unit continuously outputs images captured by alternately applying the two exposure amounts, and
   said control unit swaps an application order of the two exposure amounts in said imaging unit.

4. The apparatus according to claim 2, wherein said imaging unit continuously outputs images captured by alternately applying the two exposure amounts, and
   said control unit shifts extraction of images to be used as the first image and the second image for one image from the images continuously output from said imaging unit.

5. The apparatus according to claim 2, wherein said analyzing unit analyzes whether a bright part or a dark part is dominant in the first image, and determines which of the two exposure amounts is appropriate based on the analysis result.

6. The apparatus according to claim 5, wherein said analyzing unit determines that an image having a smaller exposure amount is appropriate when the bright part is dominant, and determines that an image having a larger exposure amount is appropriate when the dark part is dominant.

7. The apparatus according to claim 2, wherein said analyzing unit analyzes whether or not a part where a motion has occurred is dominant in an image output from said image capture apparatus, and determines which of the two exposure amounts is appropriate based on the analysis result.

8. The apparatus according to claim 7, wherein said analyzing unit determines whether or not a part where a motion has occurred is dominant based on an imaging condition set in said image capture apparatus.

9. The apparatus according to claim 7, wherein said analyzing unit estimates a part where a motion has occurred from the first image and the second image, and determines which of the two exposure amounts is appropriate based on the estimation result.

10. The apparatus according to claim 9, wherein when a size of the part where the motion has occurred, which is estimated by said analyzing unit, exceeds a predetermined value, said control unit controls the correspondence so that an image having a smaller exposure amount is used by said generation unit.

11. The apparatus according to claim 9, wherein said tone compression unit controls a degree of tone compression using the tone compression characteristics based on a size and a moving amount of the part where the motion has occurred, which is estimated by said analyzing unit.

12. The apparatus according to claim 9, wherein when a smaller exposure amount is assigned to the first image, said tone compression unit strengthens the degree of tone compression using the tone compression characteristics as a product of the size and the moving amount of the part where the motion has occurred is larger, and
when a larger exposure amount is assigned to the first image, said tone compression unit weakens the degree of tone compression using the tone compression characteristics as the product of the size and the moving amount of the part where the motion has occurred is larger.

13. The apparatus according to claim 1, wherein said composing unit determines a pixel of a motion part or a still part based on a difference between pixel values of corresponding pixels of the first image and the second image, and
said composing unit composes the first image and the second image using an image having a larger exposure amount for the pixel of the motion part and an image having a smaller exposure amount for the pixel of the still part.

14. An image capture apparatus, which generates an image, a dynamic range of which is expanded, by composing n (n is a natural number not less than 3) images having different exposure amounts, comprising:
an imaging unit configured to continuously output images obtained by imaging operations which sequentially apply n different exposure amounts;
a composing unit configured to obtain a composed image, a dynamic range of which is expanded, by sequentially composing n images continuously output from said imaging unit;
a generation unit configured to generate tone compression characteristics based on an intermediate composed image obtained in a stage before an (n−1)-th stage by said composing unit, and an image generated by reducing a resolution of the intermediate composed image; and
a tone compression unit configured to compress tones of the composed image obtained by said composing unit using the tone compression characteristics generated by said generation unit; and
a holding unit configured to hold, in a memory, a first image of the n images to be composed or the intermediate composed image output from said composing unit,
wherein said generation unit generates the resolution-reduced image of the intermediate composed image parallel to a holding operation of the intermediate composed image in the memory.

15. The apparatus according to claim 14,
wherein said composing unit composes an image currently output from said imaging unit and an image held in the memory, and outputs a composed image to said holding unit.

16. The apparatus according to claim 15, further comprising:
an analyzing unit configured to analyze an image of a first frame of the n frames or the intermediate composed image output from said composing unit, so as to determine whether the n-th image is an image to which a maximum exposure amount of the n exposure amounts is applied or an image to which a minimum exposure amount is applied; and
a control unit configured to control correspondence between the n images and the n exposure amounts based on the determination result of said analyzing unit.

17. An image processing apparatus, which generates an image, a dynamic range of which is expanded, by composing two images having different exposure amounts, comprising:
a composing unit configured to generate a composed image, a dynamic range of which is expanded, by composing a first image and a second image which follows the first image, the first image and second image being obtained by imaging operations that sequentially apply two different exposure amounts;
a holding unit configured to hold the first image in a memory for the image composing;
a generation unit configured to generate tone compression characteristics based on the first image held in the memory and an image generated by reducing a resolution of the first image; and
a tone compression unit configured to compress tones of the composed image using the tone compression characteristics generated by said generation unit.

18. An image processing apparatus, which generates an image, a dynamic range of which is expanded, by composing n (n is a natural number not less than 3) images having different exposure amounts, comprising:
a composing unit configured to obtain a composed image, a dynamic range of which is expanded, by sequentially composing n images obtained by imaging operations which sequentially apply n different exposure amounts;
a generation unit configured to generate tone compression characteristics based on an intermediate composed image obtained in a stage before an (n−1)-th stage by said composing unit, and an image generated by reducing a resolution of the intermediate composed image; and
a tone compression unit configured to compress tones of the composed image obtained by said composing unit using the tone compression characteristics generated by said generation unit; and
a holding unit configured to hold, in a memory, a first image of the n images to be composed or the intermediate composed image output from said composing unit,
wherein said generation unit generates the resolution-reduced image of the intermediate composed image parallel to a holding operation of the intermediate composed image in the memory.

19. An image processing method, which generates an image, a dynamic range of which is expanded, by composing two images having different exposure amounts, comprising:

an acquisition step of acquiring a first image and a second image which follows the first image by imaging operations that sequentially apply two different exposure amounts;

a holding step of holding the first image in a memory;

a composing step of generating a composed image, a dynamic range of which is expanded, by composing the second image and the first image held in the memory;

a generation step of generating tone compression characteristics based on the first image and an image generated by reducing a resolution of the first image, wherein the resolution-reduced image is generated parallel to a holding operation of the first image in the memory; and a tone compression step of compressing tones of the composed image using the tone compression characteristics generated in the generation step.

20. A non-transitory storage medium storing a program for controlling a computer to execute respective steps of an image processing method of claim 19.

21. An image processing method, which generates an image, a dynamic range of which is expanded, by composing n (n is a natural number not less than 3) images having different exposure amounts, comprising:

a composing step of obtaining a composed image, a dynamic range of which is expanded, by sequentially composing n images obtained by imaging operations which sequentially apply n different exposure amounts;

a generation step of generating tone compression characteristics based on an intermediate composed image obtained in a stage before an (n−1)-th stage in the composing step, and an image generated by reducing a resolution of the intermediate composed image; and a tone compression step of compressing tones of the composed image obtained in the composing step using the tone compression characteristics generated in the generation step; and a holding step of holding, in a memory, a first image of the n images to be composed or the intermediate composed image output from said composing unit, wherein said generation unit generates the resolution-reduced image of the intermediate composed image parallel to a holding operation of the intermediate composed image in the memory.

22. A non-transitory storage medium storing a program for controlling a computer to execute respective steps of an image processing method of claim 21.

* * * * *